INVENTOR.
DANIEL A. ZMUDA
BY
Harry O. Ernsberger
ATTORNEY

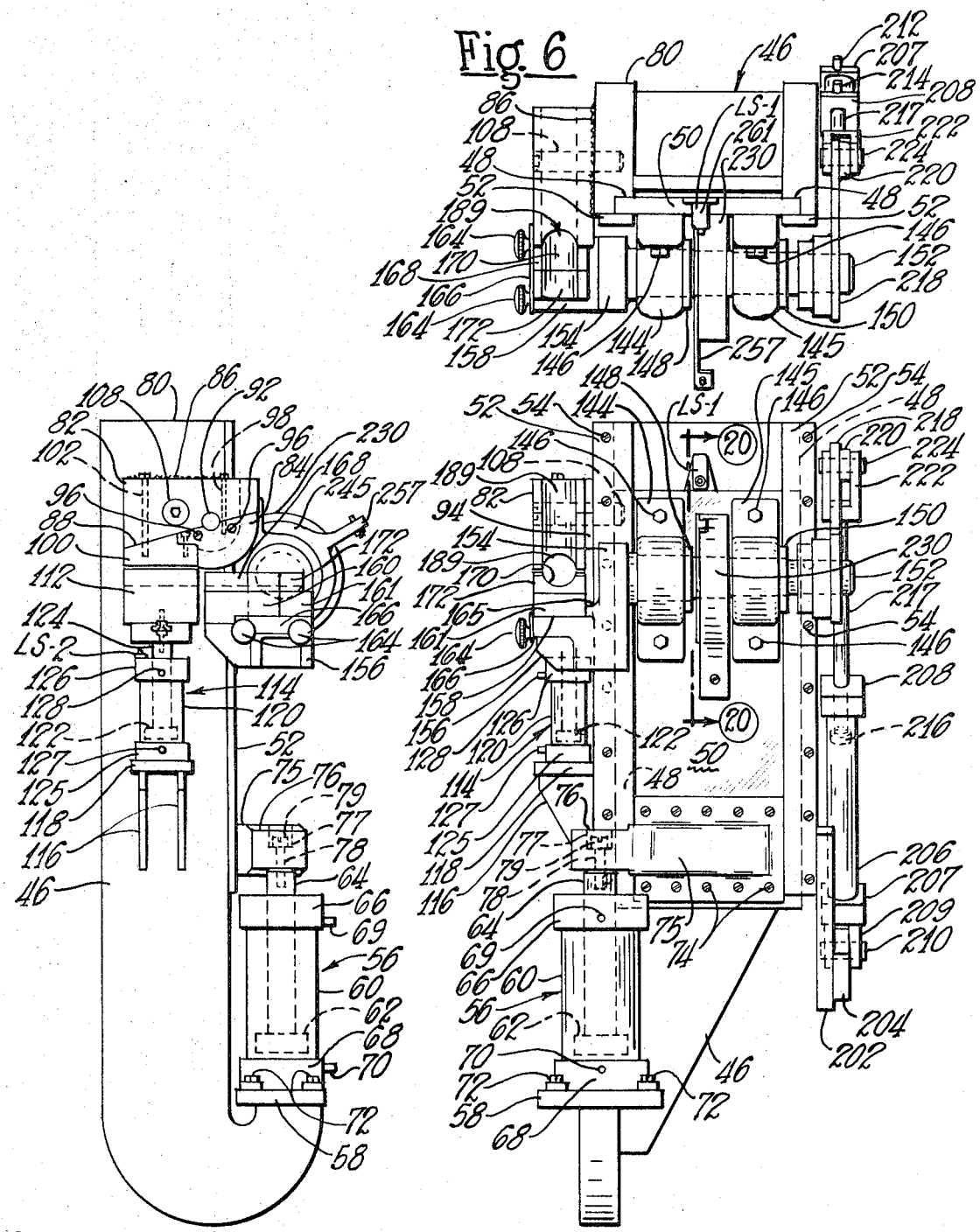

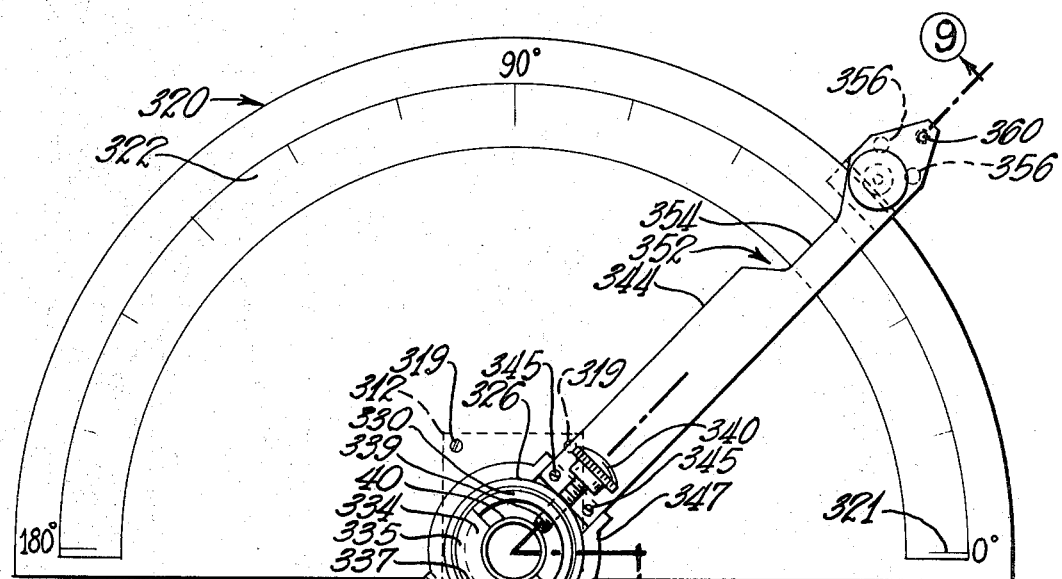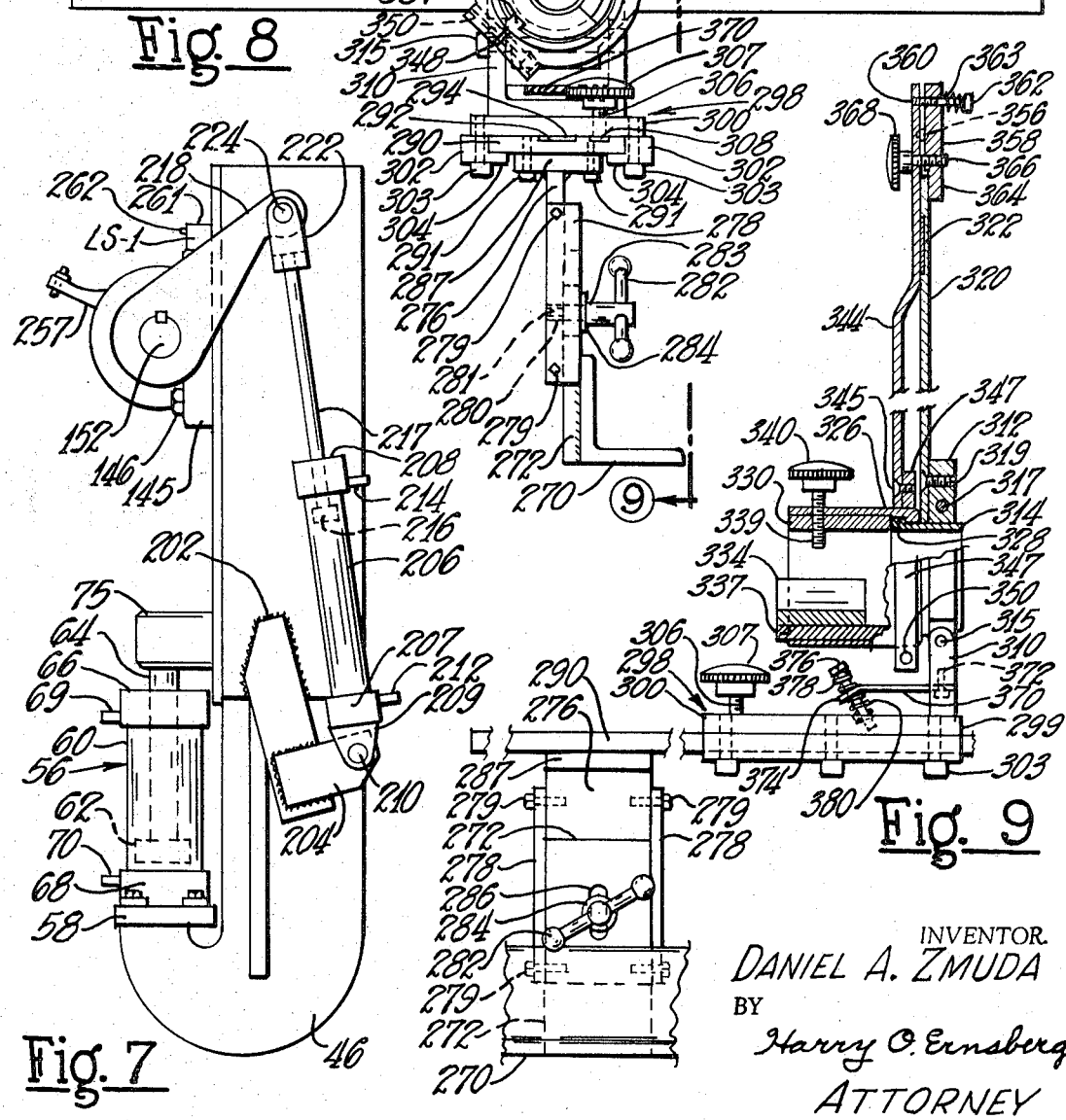

INVENTOR.
DANIEL A. ZMUDA
BY
Harry O. Ernsberger
ATTORNEY

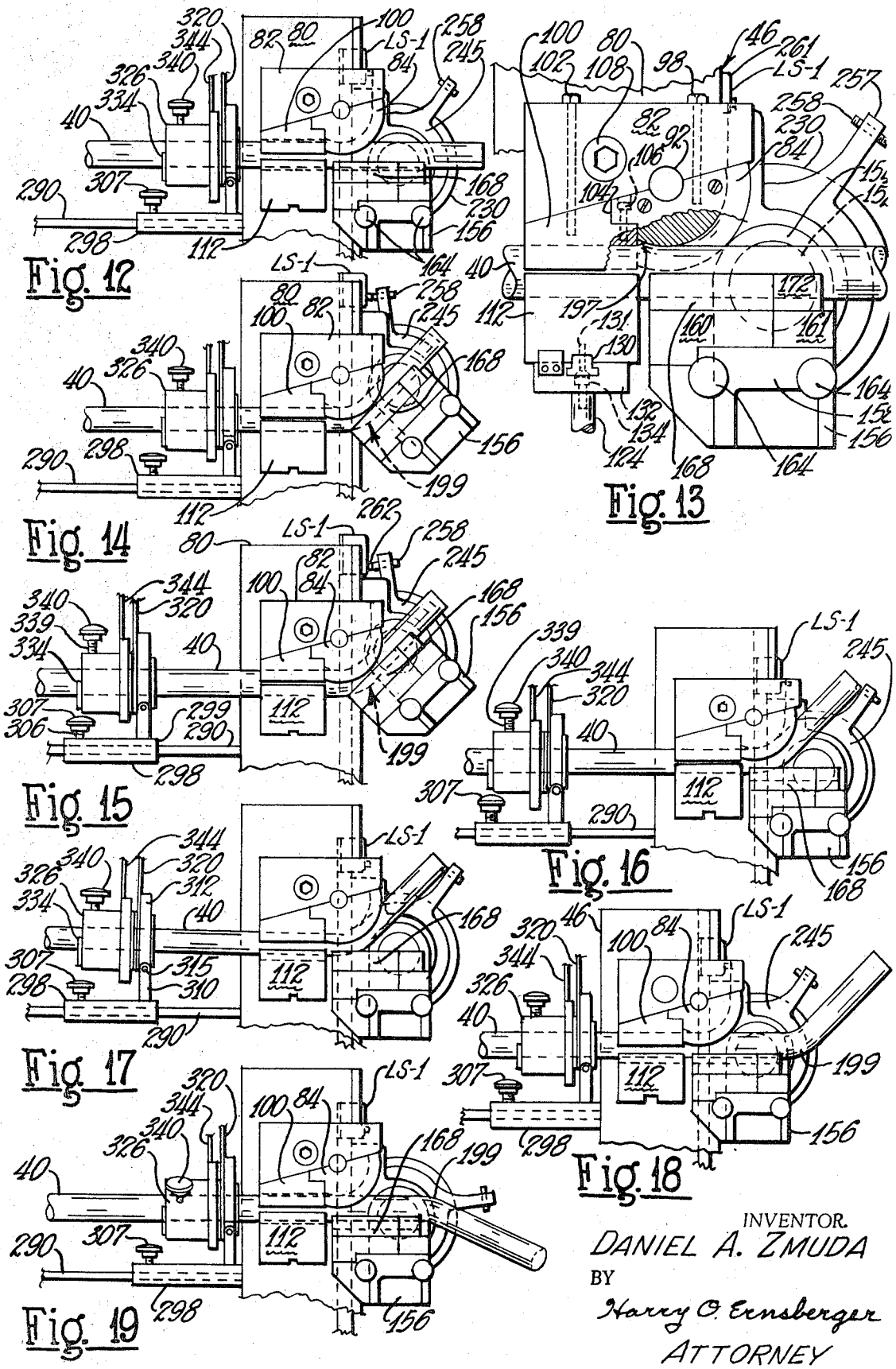

Jan. 26, 1971  D. A. ZMUDA  3,557,586
APPARATUS FOR BENDING TUBING
Filed June 12, 1968  9 Sheets-Sheet 6

INVENTOR.
DANIEL A. ZMUDA
BY
Harry O. Ernsberger
ATTORNEY

INVENTOR.
DANIEL A. ZMUDA
BY
Harry O. Ernsberger
ATTORNEY

United States Patent Office 3,557,586
Patented Jan. 26, 1971

3,557,586
APPARATUS FOR BENDING TUBING
Daniel A. Zmuda, Toledo, Ohio, assignor to Oldborg Manufacturing Company, Grand Haven, Mich., a corporation of Michigan
Filed June 12, 1968, Ser. No. 736,317
Int. Cl. B21j 7/26
U.S. Cl. 72—22
18 Claims

ABSTRACT OF THE DISCLOSURE

This disclosure embraces a method of and apparatus for forming or impressing successive bends in tubing, such as exhaust pipes for internal combustion engine exhaust systems, the method and apparatus providing for forming successive bends of various depths and angularities while maintaining positive control of the tubing during the successive operations to assure the proper orientation of the bends in the tubing.

---

This invention relates to a method of and apparatus for bending tubing or tubular stock and the like and more especially to a method of and apparatus for forming or impressing successive bends in exhaust pipe and during repositioning of the tubing and the performance of successive bending operations or maintaining positive control of the position of the pipe or tubular stock to assure accurate orientation of the bends in the formed tubing or exhaust pipe.

The frame or chassis construction of an automotive vehicle, and particularly automobiles of recent years having comparatively low silhouettes, embodies many cross frame members and struts in order to provide necessary strength characteristics. In order to convey the exhaust gases from the engine for discharge at the rear of the vehicle it becomes necessary to impress or form many bends of various depths and angularities in exhaust pipes or tail pipes in order to avoid interference with the vehicle frame members or struts. Exhaust pipes are usually several feet in length and must be fashioned with many bends and at varying depths and degrees of angularity. In the production of quantities of a pipe having a particular number and pattern of bends, comparatively large presses are employed equipped wtih a reciprocable bending die cooperating with movable bending shoes or wing dies, the reciprocating die in cooperation with the wing dies forming a bend in a pipe or tube, both regions of the pipe adjacent the bend being moved concomitantly from an initial position during a bending operation. A tube bending press of this general character is illustrated in Pat. 2,887,141. In order to produce successive bends in a tube on a press of this character, adjustable stops spaced from the press are arranged to be successively engaged by an end of the tube in order that the pipe or tubing embody a particular pattern of bends.

Whenever the press is adjusted to produce a pipe having a different pattern of bends therein, all of the stops must be adjusted and depth of bend abutments adjusted by the use of a master pipe or tube desired to be duplicated. By reason of the comparatively large number of models and types of automotive vehicles, each requires a pipe having a particular number and orientation of bends in order to be properly assembled with a chassis frame of a vehicle. As exhaust pipes and tail pipes are fashioned of steel, they are subjected to severe weather conidtions and deterioration is comparatively rapid, usually necessitating frequent replacement. As it is uneconomical for a manufacturer of exhaust pipes to adjust or set up a press for a small number of pipes, it is a usual practice for a manufacturer of exhaust pipes and tail pipes to produce a substantial number of identical bent pipes at one setting of the press and stops or abutments. The bent pipes are then stored until sold to customers desiring the exhaust pipe or tail pipe for a particular model automobile. By reason of the large number of pipes that a manufacturer is required to carry in stock, the storage of the pipes may require several acres of covered storage space and necessitate complex inventory control, rendering the system very costly. Furthermore, distributor outlets must carry a substantial inventory of bent pipes for various models of automobiles in order to supply garages and service establishments when a particular bent pipe is needed for replacement.

Endeavors have been made to develop a method and apparatus whereby a length of tubing or pipe could be employed to effect the formation or impression of the required number of bends the proper depth and angularity to replace a particular pipe, but up to the present time there has been no satisfactory method or apparatus of a character which would enable the fashioning of the proper bends in a length of pipe to duplicate a pipe for replacement without the use of highly skilled labor and at a high cost and which would not be competitive with pipes bent or fashioned in the manner hereinabove described.

The invention embraces a method of forming successive bends in a pipe, tubular member or tubular stock wherein the tubular member or tubular stock is controlled through each step of a series of method steps whereby each of the bends may be formed of desired depth and angularity and the proper distances between successive bends is assured so that the bent pipe or tubular member will accurately conform to the requirements of a particular installation where the pipe or tubular member is used.

Another object of the invention resides in a method of forming a bend in metal tubing or stock involving the steps of effecting initial flow or displacement of the metal at a local region adjacent the zone of initiation or start of the formation of a bend immediately followed by a bending operation whereby movement of the metal by the displacement step is continued in the bend formation step whereby a smooth contour bend is attained.

Another object of the invention is the provision of a method of forming successive bends in straight metal tubing or tubular stock to fashion an exhaust pipe or tail pipe for an automotive installation wherein the bends are of a character to minimize reduction in cross sectional area of the pipe at the bends without the use of a mandrel.

Another object of the invention resides in a method of establishing a bend in a comparatively thin-walled metal tube wherein the metal of the tube adjacent the starting region of a bend is subjected to forces prior to a bending operation to cause initial movement or flow of the metal of a character enabling the formation of a bend without appreciably thinning the wall of the tube or collapsing the metal at the bend whereby a bend is formed of smooth contour and without effecting reduction in the strength characteristics of the metal at the region of the bend.

Another object of the invention embraces a method wherein a straight length of thin-walled metal tube, such as tubing used for exhaust pipes and tail pipes of exhaust gas systems, is successively advanced as successive bends are formed in the pipe wherein a region of the tube adjacent a bend to be formed is clamped or secured in a manner wherein stretching of the metal is held to a minimum and the bending forces applied to the tube in a manner to effect bends of different depths and wherein the tube throughout the formation of successive bends is controlled by positive means whereby the bends are accurately formed with the desired spacing between adjacent bends so that the tube configuration accurately conforms to a desired pattern of bends to assure proper installation in the position of use of the bent tube.

Another object of the invention resides in a method of forming successive bends in a rectilinear or straight length of thin-walled metal tube wherein the straight length portion is positively held in a fixed position during a bending operation and, during each advancing movement of the tube to the bending station the tube is secured against rotation, and pursuant to each advancing movement the tube is rotated by controlled means to assure accurate and proper angularity of a bend with respect to an adjacent bend and the depth of a bend controlled by adjustable means effective to interrupt movement of the bending instrumentality to attain the desired depth for each successive bend.

Another object of the invention embraces a method involving a pressure actuated instrumentality for forming a bend in tubular stock and utilizing counteracting forces in a manner whereby a bend is fashioned with a minimum of bending forces.

Another object of the invention resides in a method of forming successive bends in a straight tube disposed to accommodate the bent region of the tube without the necessity of providing a floor pit or a special clearance space for the bent pipe.

Another object of the invention embraces an apparatus or instrumentality for impressing or forming successive bends in a length of metal tubing wherein positive control is exercised of the positioning and advancing movements of the tubing in the performance of successive bending operations to attain a finished configurated tube with successive bends of desired spacing, angularity and depth.

Another object of the invention is the provision of a bending apparatus of comparatively small and compact construction for bending thin-walled tubing such as tubing for exhaust pipes and tail pipes wherein a single bending shoe or member is employed for forming successive bends, the apparatus being of a character wherein the successive bends of substantially any depth or angularity may be formed without interference.

Another object of the invention resides in a pipe bending apparatus of comparatively small compact construction which is readily portable equipped with control devices and instrumentation rendering it adaptable for forming successive bends in a straight length of pipe wherein the bends may be of different spacing, of different depths and of different angularities enabling the production of an exhaust pipe or tail pipe particularly for replacement which accurately conforms to the original thereby assuring a proper replacement installation.

Another object of the invention resides in a portable bending apparatus for forming successive bends in a pipe whereby an unskilled operator, given the parameters for the finished bent pipe, is enabled to rapidly and accurately form a replacement exhaust pipe or tail pipe.

Another object of the invention resides in an apparatus for bending thin-walled metal tubing embodying a single bending member or wing die which is movable about a relatively fixed matrix in forming a bend and wherein the tubing adjacent the region of a bend is securely held or clamped to prevent distortion or stretching of the tubing other than at the region of the tubing in which a bend is being formed.

Another object of the invention resides in a bending apparatus embodying a single bending instrumentality for bending tubing about a relatively fixed matrix, and clamping or securing the tubing in a manner whereby the application of force to the bending instrumentality effects initial lateral displacement or distortion of the tubing at a localized region to thereby engender preliminary flow of the metal of the tube at the start of a bending operation on the tubing.

Another object is the provision of a tube bending apparatus disposed in one angular position to accommodate the pipe with a plurality of bends with ample clearance space rendering unnecessary a pit or excavation below floor level and the apparatus further arranged at a forward angle or inclination to facilitate more convenient operational access for the operator.

Another object is the provision of a small and compact bending apparatus for bending tubular stock wherein the clamping and bending components are readily interchangeable to accommodate tubular stock of various diameters.

A further object of the invention resides in a metal tube configurated with a circular cylindrical portion and an arcuately shaped portion with a region of the metal joining the portions displaced laterally and outwardly of the circular cylindrical portion.

Further objects and advantages are within the scope of this invention such as relate to the arrangement, operation and function of the related elements of the structure, to various details of construction and to combinations of parts, elements per se, and to numerous other features as will be apparent from a consideration of the specification and drawing of a form of the invention, which may be preferred, in which:

FIG. 4 is an enlarged side view of a portion of the apparatus illustrated in FIG. 2;

FIG. 5 is a front elevational view of the apparatus shown in FIG. 4;

FIG. 6 is a top plan view of the apparatus illustrated in FIG. 4;

FIG. 7 is a rear view of the apparatus illustrated in FIG. 4;

FIG. 8 is an elevational view taken on the line 8—8 of FIG. 1;

FIG. 9 is a detail view, partly in section, the view being taken substantially on the line 9—9 of FIG. 8;

FIG. 12 is a front elevational view similar to FIG. 11 illustrating the tube advancing carriage and the position of a tube in clamped position preparatory to making a bend in the tube;

FIG. 13 is an enlarged view of a portion of the apparatus shown in FIG. 12 illustrating the initial step of engaging the bending shoe with the tube to effect cold flow of the metal of the tube preparatory to a bending operation;

FIG. 14 illustrates the position of the tube bending shoe at the completion of a bend in the tube;

FIG. 15 illustrates a subsequent step of repositioning the carriage at the completion of a bend in the tube;

FIG. 16 illustrates the withdrawn position of the bending shoe after the completion of a bend shown in FIG. 15;

FIG. 17 illustrates the withdrawn position of the bending shoe and the tube clamping means in tube release position;

FIG. 18 illustrates the tube advanced by the carriage to a position for a subsequent bending operation;

FIG. 19 illustrates the tube rotated through a desired angle at which a subsequent bend is to be formed;

Figure 1:
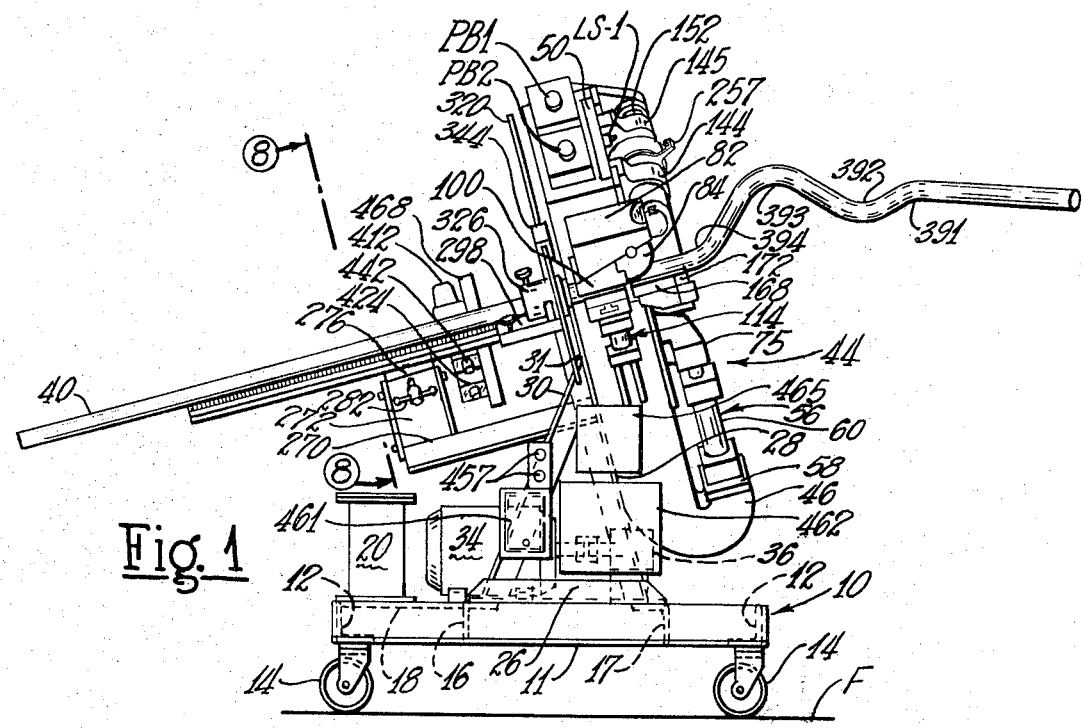
FIG. 1 is a front elevational view illustrating an embodiment of the tube bending apparatus of the invention.

While the method of and apparatus for bending pipe are especially usable for impressing or forming a plurality of successive bends in a metal pipe or tube employed as a component in an exhaust gas system for an internal combustion engine, it is to be understood that the method and apparatus of the invention may be employed for bending pipe or tubular stock into various contours and configurations for any purpose where it is desired to utilize bent tubing or pipe.

The bending apparatus of the invention may be supported by any suitable frame means and in the embodiment illustrated, the tube bending apparatus is supported by a frame component preferably mounted on caster wheels for portability, or the frame may be directly mounted on a floor or other support. Referring to the drawings and initially to FIGS. 1 through 7, in the embodiment illustrated, the frame constituting the mounting means or support for the bending apparatus is inclusive of a base frame structure 10 comprising spaced parallel side members 11 preferably of L-shaped cross section joined by end members 12 of L-shaped cross section, the end members being abutted against and welded to the side members 11 to form a generally rectangular support means.

The base frame 10 is equipped with conventional caster wheels 14 rendering the apparatus readily portable. The parallel side members 11 are joined by transversely extending struts or braces 16 and 17 preferably of L-shaped cross section and having their respective ends welded to the side members 11. Extending between the transverse member 16 and the end member 12 are transversely spaced members 18, shown in FIGS. 1 and 3, the ends of the strips being welded respectively to the member 16 and the adjacent end member 12.

The strips 18 provide a support for a tank or reservoir 20 containing fluid such as oil for operating the actuators to carry out or perform the method steps in bending pipe or tubing. Mounted upon the base construction 10 is a pair of triangularly shaped frame components 22 and 24.

Figure 2:
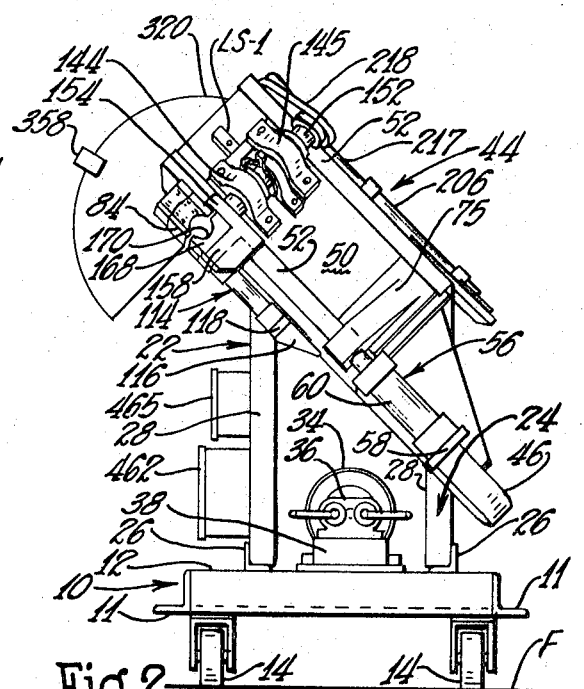
FIG. 2 is an elevational view of the right-hand side of the apparatus shown in FIG. 1.

As shown in FIGS. 1 and 2, each triangularly shaped structure includes a horizontal bar 26 preferably of L-shaped cross section, an upwardly extending member 28 which is slightly inclined from a perpendicular position as shown in FIG. 1, and a second angularly disposed member 30.

The lower ends of the members 28 and 30 are welded to the respective ends of the horizontal member 26 in each of the frame constructions 22 and 24. The upper end of each of the angularly disposed strut members 30 is welded as at 31 to the adjacent member 28. Also mounted upon cross members of the base structure 10 is a motor 34 which drives a hydraulic pump 36, the motor and pump unit being preferably mounted upon a sub-base 38 carried by and secured to the main base frame 10.

The apparatus of the invention for impressing successive bends in tubing, tubular stock or pipe 40 is of the character whereby the operative components for forming bends in a tube or pipe 40 are so fashioned and coordinated as to provide a modular unit adapted to be mounted upon the frame structure hereinbefore described or which may be mounted or supported on frame structure of other configuration. The modular unit 44 is inclusive of a main frame member 46 which may be of cast metal and upon which is mounted the tube clamping and bending apparatus.

In the embodiment illustrated, a tube clamping means, a tube bending means and reactive force means for the tube bending means are hydraulically operated, the hydraulic actuators being supported upon the frame member 46.

The member 46 is fashioned with lengthwise arranged parallel recesses 48 in which is slidably mounted a slide, plate or ram member 50, the member 50 being disposed between the side walls of the recesses 48. Plates 52 are secured by screws 54 to the portions of member 46 adjacent the recesses whereby the slide or member 50 is guided by the ways provided by the recesses 48 and the plates 52.

A hydraulic actuator 56 is provided for reciprocating the slide or member 50 and components carried thereby. The member 46 is fashioned or configurated with an anvil portion or pad 58 upon which is mounted the hydraulic cylinder 60 of actuator 56. Reciprocably disposed in the cylinder 60 is a piston 62 mounted on the end of a rod 64, the latter extending exteriorly of the cylinder. The cylinder is provided with upper and lower heads 66 and 68, tubes 69 and 70 being connected respectively with the heads for conveying fluid such as oil for actuating the piston 62, the cylinder head 68 being fixedly secured to the pad 58 by bolts 72.

Secured to the slide or member 50 by screws 74 is a transversely projecting member 75 having a portion 76 adjacent the end of the piston rod 64. The end of the rod 64 abuts the lower surface of the portion 76. The upper end of the rod 64 is bored and threaded to receive a securing bolt 78, the head 79 of the screw being disposed in a counterbore 77 provided in the portion 76. The upper end of the rod 64 abutting the portion 76 of member 75 effects the transmission of fluid force against the piston 62 directly through member 75 to reciprocate the slide 50 for performing tube bending operations.

Figure 11:
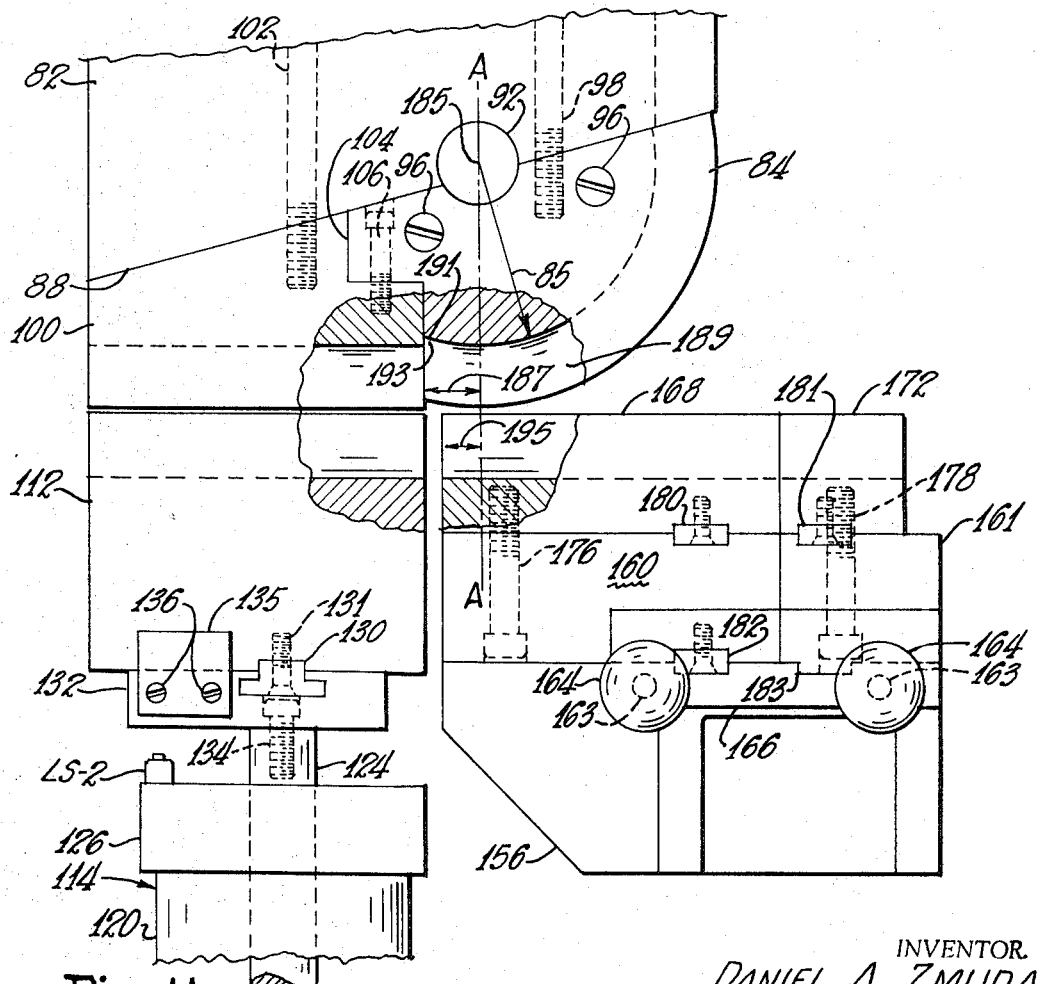
FIG. 11 is an enlarged front view of the tube clamping and tube bending components of the apparatus.

As shown particularly in FIGS. 5, 6 and 11, there is secured to the upper end portion 80 of the frame member 46 an abutment block 82 which forms a bolster member providing support for the stationary die or matrix 84 about which a tube is to be bent in performing bending operations. The abutment or bolster block 82 is welded to the portion 80 of member 46 as indicated at 86. The abutment block 82 is fashioned with its lower surface 88 at an angle with respect to the longitudinal axis of the frame member 46.

The stationary die 84 is provided with an angularly-arranged surface which mates with and abuts against the surface 88 as shown in FIG. 5. A dowel 92 is pressed into a bore formed in the upper portion 80 of member 46, the abutment block 82 and the die 84 each being formed with a portion of a circular cylindrical configuration engaging the dowel 92 for positively positioning the die 84 with respect to the abutment block 82. The die 84 is secured to a ledge or pad portion 94 of the abutment block 82 by means of screws 96, shown in FIGS. 5 and 11. The die 84 is secured to the bolster or backing member by means of a bolt 98, shown in FIGS. 5 and 11.

Clamp means is provided for securely holding a tube adjacent a region to be bent during a bending operation.

The clamp means includes a stationary section 100 shown in FIGS. 5 and 11, which abuts against the angular surface 88 of the abutment block 82 and is secured to the block 82 by a bolt 102.

The upper section 100 of the tube clamping means is fashioned with a recess to accommodate a projection 104 on the stationary die 84 and the overlapping portions of the section 100 and stationary die 84 are provided with aligned openings to receive a securing bolt 106.

The abutment block 82 and the portion 80 of member 46 are provided with aligned threaded openings to receive a threaded member 108 as a further anchoring means for the abutment block 82 in addition to the welding 86. The tube clamping means includes a relatively movable section 112, the tube clamping sections being particularly shown in detail in FIGS. 22 and 23. A hydraulic actuator 114 is provided for actuating the movable tube clamping section 112, the actuating means being shown in FIGS. 1, 2, 4 and 5.

Welded or otherwise secured to the member 46 are brackets or bracket means 116 upon which is mounted a platform or support member 118. Mounted on the support member 118 is a hydraulic cylinder 120 in which is reciprocably mounted a piston 122 secured on a piston rod 124, the cylinder being provided with end heads 125 and 126 equipped with fluid conveying tubes 127 and 128 to facilitate fluid flow into and out of the cylinder 120 for actuating the piston 122. The means connecting the piston rod 124 with the clamping shoe 112 is particularly illustrated in FIG. 11.

The clamping shoe 112 is provided with a transversely extending T-shaped key 130 secured to the clamping shoe 112 by a screw 131. A member 132 disposed beneath the shoe 112 is equipped with a T-shaped slot accommodating the key 130, this means providing for slidable assembly of the member 132 with the clamping shoe 112. The end of the piston rod 124 abuts the lower surface of member 132, the latter being secured to the piston rod by a bolt 134. The tube clamping die 112 is secured against transverse movement by a plate 135 removably secured to the member 132 on the piston rod 124 by screws 136, the plate engaging the outer surface of the clamping die. The tube clamping die sections 100 and 112 are shown respectively in FIGS. 22 and 23.

Figure 22:
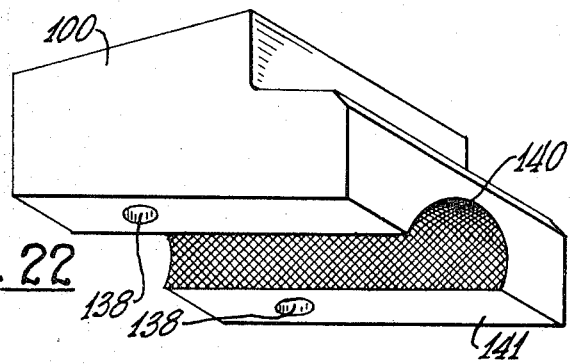
FIG. 22 is an isometric view of the stationary tube clamp section.
Figure 23:
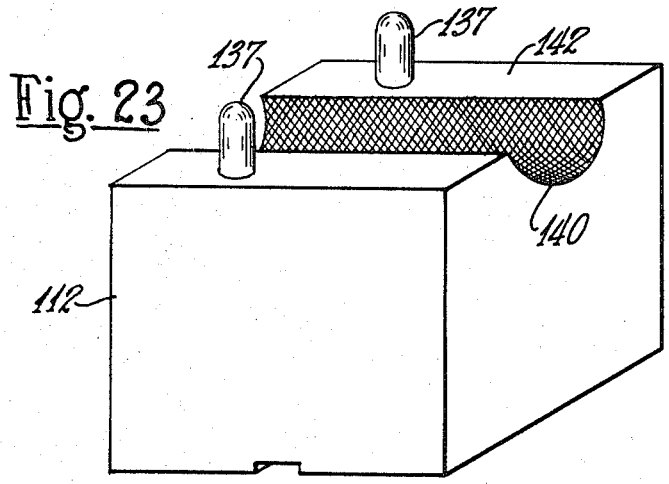
FIG. 23 is an isometric view of the movable tube clamp section.

As shown in FIGS. 22 and 23, the upper clamp section 100 is fashioned with bores 138 and the section 112 provided with dowel pins 137 which extend into the bores 138 to properly align the clamping sections. The stationary tube clamping member 100 and the movable clamping member 112 are removably supported so that clamping members for use with various sizes of tube or pipe may be interchanged.

A feature of the tube bending apparatus is the method of clamping the tube preparatory to and during a tube bending operation. As shown in FIGS. 22 and 23, each of the mating clamp sections 100 and 112 is formed with a semicylindrical recess 140, the recesses being fashioned as a cylindrical bore when the sections are mated with their surfaces 141 and 142 in engaging relation. The interior surface of each semicylindrical recess 140 is fashioned with a diamond-shaped internal knurled pattern or configuration.

Figure 24:
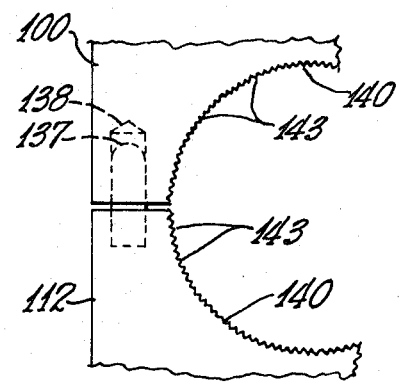
FIG. 24 is an enlarged fragmentary end view of portions of the tube clamp sections illustrating the roughened tube engaging surfaces.

The diamond-shaped pattern in the pipe clamping areas or surfaces provide a plurality of closely spaced minute projections 143 of pyramidal shapes shown in FIG. 24, the apices of the projections extending radially toward the longitudinal axis of the recesses 140 when the sections 100 and 112 are in engaging relation. When the clamp sections 100 and 112 are in tube engaging position, as shown in FIG. 24, and pressure exerted on the section 112 against a tube, the apices or points provided by the internal diamond-shaped knurling slightly indent the exterior surface of the tube being clamped to thereby positively prevent endwise movement of the rectilinear portion of the tube during a bending operation.

The tube bending shoe or bending die means, also referred to as a wing die, is supported upon a journally mounted crank member or crankshaft carried by the reciprocable slide 50. As shown in FIGS. 2, 4 and 6, bearing members 144 and 145 are secured to the reciprocable slide 50 by bolts 146. The member 144 is equipped with a bushing or bearing sleeve 148 and the bearing member 145 equipped with a bearing sleeve or bushing 150. Journaled in the bearing bushings 148 and 150 is a shaft or member 152. Integral with one end of the shaft 152 is an L-shaped portion or crank 154, the forward extending portion 156 of the crank having a platform portion 158 which supports the tube bending instrumentality, bending die or bending shoe construction.

The platform 158 supports bolster or spacer blocks 160 and 161 as shown in FIGS. 4, 5 and 11. Mounted upon the spacer block 160 is a tube bending body, shoe, wiper or bending die 168. The rear surfaces of the spacer blocks seat against a ledge 165 formed on the crank member 154. Disposed at the frontal face of the spacer blocks is a plate 166 having openings accommodating locking screws 163 having plastic manipulating heads 164.

The bending shoe or wing die 168, mounted on the spacer block 160, is fashioned with a semicylindrical recess or configuration 170 to accommodate the lower half of a tube or pipe 40 during a bending operation. The bending die 168 is supplemented by a short length bending die section 172, also having a semicylindrical recess 170, mounted upon the short length spacer block 161 as shown in FIG. 11. The bending shoe 168 is secured to the spacer block 160 by a screw 176 and the supplemental bending shoe section 172 secured to the short length spacer 161 by a screw 178. Keys 180 and 181 position the bending shoes 168 and 172 with respect to the spacer blocks 160 and 161.

A key 182 positions the spacer block 160 with respect to the ledge 156 of the crank member 154. A tongue or key portion 183 on the supplemental spacer block 161 fits in a keyway in the upper surface of the ledge 156 to position the block 161 with respect to the ledge. By tightening the screws 163, the plate 166 is brought into snug engagement with the frontal surfaces of the spacer blocks 160 and 161 to hold the blocks and the bending shoes 168 and 172 in fixed relation on the ledge portion 156 of the crank 154.

The spacer blocks 160 and 161 are made removable in order to utilize bending shoes for pipes of different diameters, each pipe requiring a particular thickness of spacer blocks 160 and 161. The bending shoe construction or wing die section 168 is used in conjunction with the supplemental or short length bending shoe section 172 in impressing usual type bends in pipe or tubular stock.

In instances where successive bends are close together and project in different directions radially from the axis of the rectilinear tube stock, the supplemental bending shoe section 172 of the bending shoe construction and the spacer block 161 may be quickly and easily removed by backing off the clamping screws 163. Thus successive bends in close relation may be fashioned by the bending shoe section or die 168 by temporarily removing the short length bending shoe section 172. The die section 172 should normally be used in forming bends particularly those which are of substantial depth, the supplemental die 172 providing additional surface area of the bending shoe construction for engagement with the tube or pipe being bent. The bending shoes or dies 168 and 172 are preferably made of brass to assure long life.

As shown in FIG. 11, there is an important relationship between the center 185 of the generatrix of the root or bottom of the curve or radius 85 of the semicircular recess 189 of the stationary die 84, the bending shoe 168 and the clamping die 100.

As shown in FIG. 11, a plane A—A, normal to the axis of a tube in clamped position between the clamping dies 100 and 112 and passing through the center of curvature of the die 84 is about three-fourths of an inch from the end of the clamping die 100. This distance is indicated by the line 187. The radius or generatrix 85 of the root or bottom of the semicircular recess or groove 189 in the curved die 84 is continued to the left of the plane A—A as viewed in FIG. 11 at the region 191 forming a generally triangular space or pocket 193 as particularly shown in FIG. 11.

The adjacent end region of the bending shoe 168 preferably extends toward the clamping die 100, an approximate distance to the left of the plane A—A indicated by the line 195 which overlaps a portion of the space 193, the extending portion indicated at 195 of the bending shoe 168 being of assistance in forcing metal of the tube or pipe to be bent into the triangular pocket or space 193.

The purpose of the space or recess 193 is to provide a region into which the metal of the tube or pipe is initially moved or cold flowed upon initial engagement of the bending shoe or wing die 168 with the tube, this condition being shown in FIG. 13, the displaced or laterally moved metal of the tube being indicated at 197 in FIGS. 13 and 25 through 30. The metal at the region 197 is forced into the generally triangular space 193 upon upward movement and engagement of the bending shoe 168 with the tube or pipe to be bent.

The pressure or force of initial engagement of the bending shoe 168 with the pipe initiates or starts lateral movement or flow of the metal of the pipe into the space 193 before the start of a bending movement of the bending shoe 168.

The preforming or initial movement of the metal into the space 193 at this localized region before a bend is initiated is important in the formation of a bend as such initial flow or movement of the metal of the tube at the region of the start of a bend has already begun. Concomitantly with the establishment of initial flow of the metal into the space 193, continued upward pressure of the bending shoe 168 starts the formation of a bend, the bending shoe 168 rotating about the axis of the crankshaft 152.

As the crankshaft 152 is journaled on the slide 50, upward movement of the slide 50 effects a wrapping or wiping of the bending shoe 168 about the periphery of the fixed bending die or matrix 84 to form a bend in the pipe 40 as shown in FIG. 14. The preflowing of the metal into the space 193 is effective in fashioning a smooth bend in the pipe or tube 40 without any wrinkles or any collapsing of the tube at the interior radius of the bend. It is believed that certain novel factors are operative in forming a smooth bend.

The clamping jaws 100 and 112 exert a gripping force on the pipe or tube 40 to an extent that during the forcing of the metal of the tube into the space 193 and during the succeeding bending operation the region of the pipe held by the clamping jaws 100 and 112 is not appreciably stretched so that during bending, the metal is flowed around the semicircular configuration of the stationary bending die 84.

The forcing of the metal of the tube into the space 193 provides the raised or laterally extending portion 197 of the tube disposed in the space 193, and this portion 197 of the tube provides an anchor means which is effective to resist stretching of the region of the tube gripped by the clamping means 100 and 112 during the formation of a bend.

To insure the proper bending of the tube or pipe by the wrapping action or bending action of the movable bending shoe or body 168 about the tube in bending the tube around the stationary die 84, it is necessary to provide the wiping shoe 168 with a backing pressure or reaction force during rotational movement of the bending shoe 168. The backing pressure should be substantially constant during a bending operation and of substantially lesser pressure than the pressure exerted on the bending shoe in a pipe bending direction.

In the embodiment illustrated, the backing force or pressure is provided by hydraulic pressure in a cylinder in conjunction with a pressure relief means to meter or bleed liquid out of the cylinder to maintain substantially constant the reaction or backing pressure resisting rotation of the bending shoe 168. An arrangement for accomplishing this function is illustrated in FIGS. 2, 3, 4, 6 and 7. As shown in FIG. 7, a member 202 is welded or otherwise secured to the main frame member 46, the member 202 supporting a bracket or abutment 204 welded thereto.

A cylinder 206 is provided with end heads 207 and 208, the end head 207 being fashioned with a clevis or bifurcated portion 209 which straddles the bracket 204. The clevis portion 209 and the bracket 204 are provided with aligned openings accommodating a pivot pin 210. The heads 207 and 208 are provided respectively with liquid conveying tubes 212 and 214 for conveying liquid into and out of the ends of the cylinder 206. Reciprocably disposed within the cylinder 206 is a piston 216 mounted on a piston rod 217 which extends through the end head 208.

Fixedly keyed onto an end region of the shaft 152 is an arm or member 218, to the distal end region of which is welded a plate 220. Mounted upon the upper end of the rod 217 is a clevis 222 which straddles the arm 218 and the plate 220. The arm 218, plate 220 and clevis 222 are provided with aligned openings to accommodate a pivot pin 224.

Through this arrangement liquid, in the cylinder 206 resists rotation of the tube bending shoe 168 in a tube bending direction. As hereinafter described the flow of liquid from cylinder 206 is metered or controlled by a pressure relief valve so as to maintain sufficient and constant backing pressure on the shaft 152 resisting but not preventing rotation of the bending shoe 168.

A method and means are provided for regulating or adjusting the angular extent or depth of a bend being formed in a tube or pipe. One form of arrangement for accomplishing this function is shown in FIGS. 1, 2, 5, 6, 7, and 12 through 21.

The arrangement is inclusive of an adjustable protractor associated with and adjustable relative to the shaft 152. Mounted upon and rotatable with the shaft 152 is a member 230 fashioned with an arm or projection 232, shown in FIGS. 20 and 21. The member 230 is fixed to the shaft 152 by a key 236 to rotate with the shaft.

Figure 20:
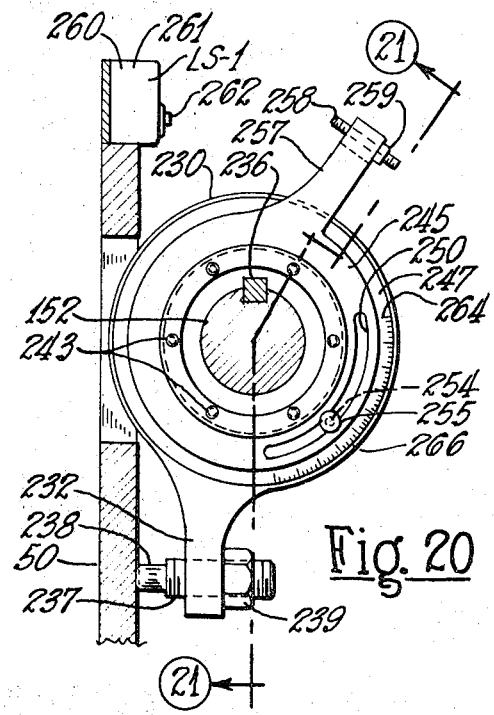
FIG. 20 is an enlarged detailed sectional view of the mechanism for determining the depth of bend in a tube, the view being taken substantially on the line 20—20 of FIG. 4.

The arm 232 is provided with a threaded bore to receive a threaded member 237 having an abutment portion 238 and provided with a nut 239. As shown in FIG. 20, the abutment 238 engages the slide 50 limiting rotation of the shaft 152 and determining a nonbending position of the bending shoe or wing die 168.

Figure 21:
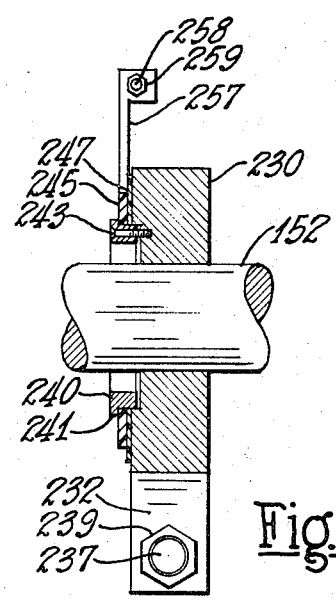
FIG. 21 is a sectional view taken substantially on the line 21—21 of FIG. 20.

As shown in FIGS. 20 and 21, there is mounted on member 230 an annulus or ring 240 having a flange 241, the ring 240 being secured to member 230 by a plurality of circumferentially spaced screws 243. Mounted on the exterior periphery of the ring 240 for rotative adjustment relative to the member 230 is a member 245 which is preferably fashioned of molded resinous material such as Lucite. Cemented to member 245 is a protractor scale 247 whereby members 245 and 247 rotate as a unit relative to the ring 240 and member 230, a flange 241 on the ring 240 preventing lateral displacement of members 245 and 247.

As shown in FIG. 20 the members 245 and 247 are fashioned with registering arcuately shaped slots 250, the curvature of the slots 250 being concentric with the axis of shaft 152. The member 230 is fashioned with a threaded bore accommodating a locking screw 254 having a knurled head 255.

The screw 254 may be manipulated so that when released, the members 245 and 247 may be rotated relative to member 230 and, upon tightening the screw 254 the members 245 and 247 will be locked to and rotatable with the member 230.

During the formation of a bend the shaft 152 is rotated and member 245 is rotated therewith. Mounted on a projection 257 of the member 245 is an adjustable abutment screw 258 which may be locked in adjusted position by a nut 259. As shown in FIG. 20, a housing 260 is secured to the slide 50, the housing 260 enclosing a limit switch LS–1. The switch LS–1 is inclusive of a movable switch plunger 262. As hereinafter described, the limit switch LS–1 is in circuit with a solenoid of a four-way valve arranged to direct fluid into the hydraulic actuator 56 for the bending shoe 168.

During the formation of a bend, the members 230 and 245 are rotated in a counterclockwise direction, as viewed in FIG. 20, and when the abutment screw 258 engages the plunger 262 of the limit switch LS–1, a second solenoid of the four-way valve is actuated to interrupt the movement of the bending shoe, this arrangement determining the depth of bend formed in a tube. By adjusting the member 245 with respect to the member 230 bends of various depths may be formed in the pipe or tubing.

The member 247 is calibrated with indicia 264 indicating degrees of angular adjustment of the member 245 with respect to the member 230. The member 230 is fashioned with a zero angle index line 266 with which the protractor graduations cooperate to determine the angularity of a bend to be made in the pipe or tube.

In forming a bend, the member 245 is preadjusted to the particular angularity of the bend desired in the pipe or tube. A bend is fashioned by wrapping or forming the adjacent portion of a tube or pipe about the stationary die 84 by the wing die or wiper shoe 168, and the forming operation continues until the abutment screw 258 engages the plunger 262 of limit switch 261 and terminates the bending cycle. Where successive bends of different angularities are to be formed, the operator, after each bend, releases the locking screw 254 and readjusts the member 245 to the angularity desired and draws up the screw 254 to lock the member 245 to the member 230, thereby predetermining the angularity or depth for the next succeeding bend to be made.

The apparatus is inclusive of means for maintaining accurate and positive control of the position of the pipe and for indexing the length of pipe between successive bends whereby the finished pipe will accurately conform in shape to a predetermined configuration or shape. The control means is inclusive of an arrangement for clamping the pipe to prevent uncontrolled movement thereof, means for controllably rotating the pipe to predetermine the direction of angularity of a bend to be formed in a pipe, and means for advancing the pipe through a predetermined distance to position the pipe preparatory to the formation of a bend.

Figure 3:
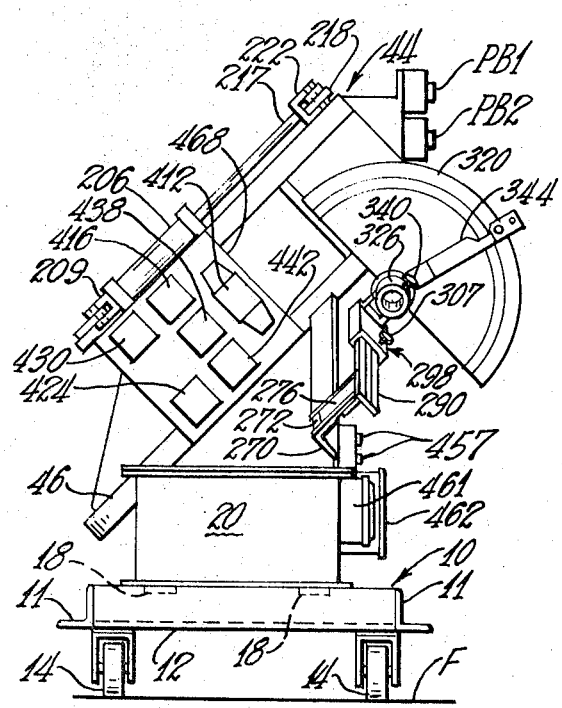
FIG. 3 is an elevational view of the left-hand side of the apparatus shown in FIG. 1.

Referring to FIGS. 1, 3, 8 and 9, a member 270 is secured to the frame 46 by welding, the member 270 being preferably of L-shaped cross section as shown in FIG. 3. Welded to the L-shaped member 270 is an upwardly extending member or plate 272.

Mounted for slidable movement vertically and disposed contiguous with the plate 272 is an adjustable slide or plate 276. Disposed at the edges of the plate 276 are members or guides 278 fastened to plate 276 by screws 279.

As shown in FIGS. 8 and 9 the members 278 are parallel and the plate 276 is slidable vertically between members 278. The plate 276 is fashioned with a threaded opening 280 to accommodate a threaded locking member or screw 281 to which is secured a manipulating handle 282, the manipulating portion of the handle having a shoulder 283 engaging a washer 284. The plate 272 is fashioned with a slot 286, the side walls of the slot being parallel with the edge plates 278. By manipulating the handle 282, the plate 276 may be adjusted vertically relative to the plate 272 and the plate 276 locked in adjusted position by the screw 281.

Figure 10:
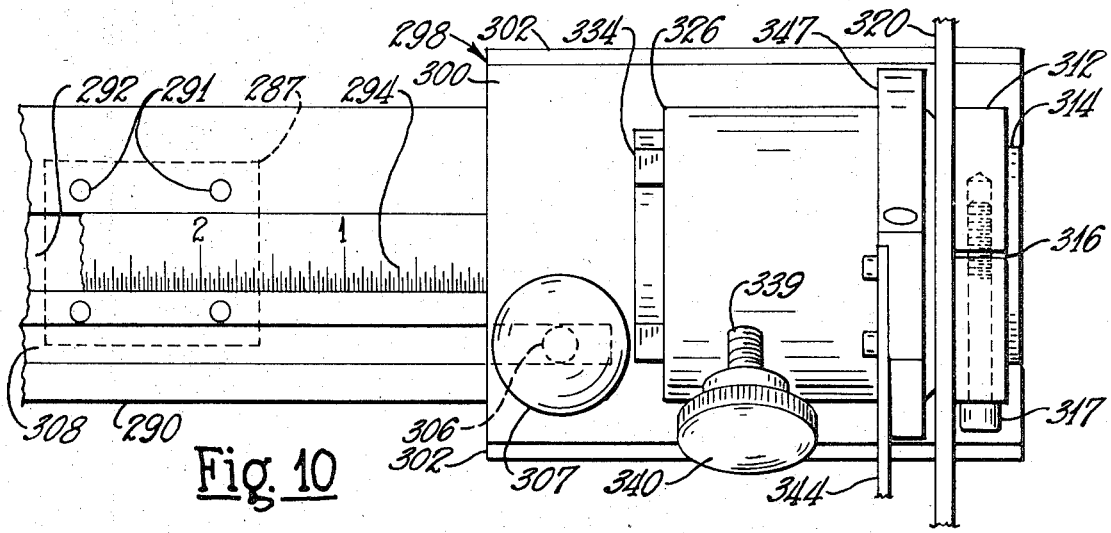
FIG. 10 is a plan view of the apparatus shown in FIG. 9.

Welded to the upper end of the plate 276 is a platform member 287. Supported upon the platform 287 is a longitudinally extending member, carriage support or track 290. The carriage support 290 is secured to the platform member 287 by screws 291. As shown in FIG. 10, the upper surface of member 290 is fashioned with a longitudinal recess 292 extending lengthwise in which is disposed a strip of metal or plastic 294 bearing graduations or indicia which may be in inches or other means for indicating the relative position of a carriage.

Slidably supported upon the member or track 290 is a carriage 298. The carriage is inclusive of a flat plate 300 extending lengthwise of the track or member 290. Disposed at the lengthwise edge regions of the plate 300 are parallel members 302 secured to the plate by screws 303. The members 302 have projections 304 underlying the edge regions of the plate 290, the members providing ways whereby the carriage 298 is slidable lengthwise of the track member 290. The plate 300 is provided with a threaded bore accommodating a screw 306 having a plastic manipulating head 307 shown in FIGS. 8, 9 and 10.

As shown in FIGS. 8 and 10, the upper surface of member 290 is fashioned with a longitudinal shallow recess 308, the locking screw 306 being aligned with the groove or recess 308. When it is desired to lock the carriage to the track 290, the screw 306 is drawn up to engage with the bottom of the recess 308. Fixedly secured to the carriage 298 is a U-shaped bracket 310 and mounted between the furcations of the bracket 310 is a member 312 which has a central bore accommodating a tubular sleeve or bushing 314, shown in FIG. 9.

The upper portion of the member 312 is split as at 316, shown in FIG. 10, and a bolt 317 is employed to clamp the member 312 tightly to the sleeve 314. The member 312 is pivotally supported upon the U-shaped bracket 310 by a bolt or shaft 315. Secured to member 312 by screws 319 is a protractor or semicircularly shaped member 320 which has a scale 322 graduated in degrees, the scale illustrated being graduated for one hundred eighty degrees.

Means is provided for rotating the tube or tubular stock 40 to predetermine the radial angularity of a bend with respect to the angularity of the preceding bend. Journally supported upon the sleeve or bushing 314 is a hollow cylindrical member 326, shown in FIG. 9. The cylindrical member 326 has a portion engaging over a flange 328 on the sleeve 314. Snugly fitted within the sleeve or cylindrical member 326 is a ring or cylindrical member 330 engaging the flange 328 whereby the cylindrical member 326 is rotatable relative to the sleeve 314 but is secured against endwise movement by the ring 330.

The inside diameter of the sleeve 314 and the ring 330 is such as to accommodate the tubing or tubular stock of largest diameter to be bent by the bending apparatus. Removable means is provided for insertion in the ring 330 to accommodate tubular stock of different diameters, said means cooperating with a locking element to lock the tubing or tubular stock in a position with the axis of the tubing or tubular stock coincident with the axis of the sleeve or bushing 314. As shown in FIG. 8, there is disposed within the ring 330 a semicylindrically shaped sleeve or member 334 having an interior diameter of a dimesion to fit a particular diameter of tube.

The semicylindrical member 334 has a flange 335 which is notched to accommodate a projection 337 on the ring 330 so as to position the member 334 against rotational movement in the ring 330.

The cylindrical member 326 and the ring 330 are fashioned with registering threaded openings to receive a locking screw 339 equipped with a plastic manipulating knob 340. As shown in FIG. 8, the screw 339 may be drawn into locking engagement with the tube 40 which is centered and supported by the bushing member 334.

When a different size of tubing or pipe is to be accommodated, the bushing 334 is removed and a similar bushing of different internal diameter inserted in the ring 330 so that the axis of the tube or pipe will be coincident with the axis of the cylindrical sleeve 314.

A lever or arm 344 is provided which cooperates with the protractor member 320 and the rotatable sleeve or bushing 326 for rotating the tubing or pipe to predermine the angularity of a bend to be formed in respect of the relative position of a preceding bend in the tubing or pipe. This arrangement is illustrated in FIGS. 1 through 3, 8 and 9. The lever or arm 344 is secured by screws 345 to an annular or ring-shaped member 347.

The annularly shaped member 347 is split as at 348, the two boss portions adjacent the split or kerf 348 fashioned on the ring 347 accommodating a bolt 350 for clamping the annular member 347 to the sleeve 326 whereby movement of the arm 344 rotates the sleeve 326. The lever or arm 344 is fashioned with a recess 352 providing an index surface 354 preferably at the central longitudinal axis of the lever 344, the surface 354 providing a movable index for cooperation with the degree indicia 322 on the protractor member 320.

Means is provided for readily securing or locking the lever 344 is adjusted position relative to the protractor member 320. The upper end region of the lever 344 is fashioned with two shallow recesses to accommodate spherical members or balls 356. Disposed adjacent the upper end region of the lever 344 is a plate or member 358, the plate having detents to accommodate the balls 356, as shown in FIG. 9. The balls 356 provide a fulcrum means to accommodate slight rocking or tilting movement of the plate 358 with respect to the lever 344.

The upper extremity of the lever or arm 344 is provided with a threaded bore accommodating a threaded member or screw 360, the member 360 extending through an unthreaded bore in the plate 358. The screw 360 is provided with a knurled head 362, an expensive coil spring 363 being disposed between the plate 358 and the knurled head 362. A portion 364 of the plate 358 overlaps and is contiguous with the peripheral arcuate region of the protractor member 320, as shown in FIG. 9. A locking screw 366 extends through an opening in the lever 344 into a threaded bore in the plate 358, the screw 366 being equipped with a plastic manipulating knob 368.

By releasing the locking screw 366, the spring 363 swings the plate 358 about the fulcrum means provided by the balls 356 to release the lever 344 from locking engagement with the protractor member 320 to facilitate rotation of the lever 344 with respect to the protractor member 320 and thereby rotate the tube or pipe 40 which is locked to the sleeve 326 by the locking screw 339. The method steps performed by the arrangement shown in FIGS. 8 and 9 will be hereinafter described.

As shown in FIG. 9, an arm 370 is secured to the lower portion of the member 312 by screws 372. The angularly disposed end region 374 of arm 370 is bored to accommodate a bolt 376 which is threaded into an opening in the plate 300 of the carriage. Disposed between the head of the bolt and the portion 374 is a coil spring 378 and disposed between the plate 300 and the portion 374 is a coil spring or other resilient member 380. The member 380 may be semi-hard rubber.

The coil springs 378 and 380 provide a resilient cushioning means for the member 312, the protractor member 320, the sleeve 326 and the lever 344 and associated components. In the event that the pipe 40 tends to stick or adhere to the clamping dies 100 and 112 and requires manually applied lateral force or impact to loosen it, the assembly comprising member 312, sleeves 314 and 326, bushing 334 and associated components is arranged for slight pivotal movement about the pivot pin 315 as restricted by the resilient means 378 and 380 to prevent damage to these components without disturbing the locking of the pipe 40 by the screw 339 so that there is no loss of control of the position of the pipe 40.

The method and apparatus of the invention are particularly adaptable for impressing successive bends in pipe, tubing or tubular stock for use as exhaust pipe for the exhaust system of an automotive engine. Where the pipe or tubing is for fashioning exhaust pipes for exhaust systems for various types of internal combustion engines, different diameters of stock may be used as, for example, 1¾ inch diameter, 2 inch diameter, 2¼ inch diameter and other sizes where required.

As shown in FIG. 1, a length of pipe, tubing or tubular stock 40 is normally rectilinear as shown at the left-hand side of the bending apparatus, as viewed in FIG. 1, the portion of the pipe at the right-hand side of the apparatus having been formed into bends identified at 391, 392, 393 and 394. Tubular stock of any length may be used and bends of various depths and angularities may be formed with different distances between successive bends.

Figure 25:
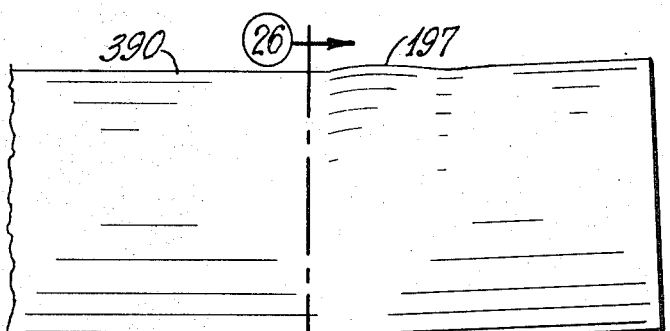
FIG. 25 is a side elevational view of a portion of a tube illustrating the shape of the tube established by initial cold flow of the metal of the tube preparatory to forming a bend.
Figure 26:
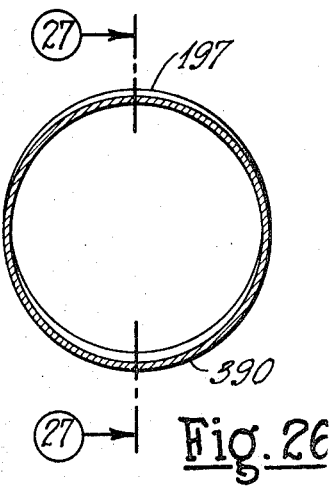
FIG. 26 is a transverse sectional view through the tube, the view being taken substantially on the line 26—26 of FIG. 25.
Figure 27:
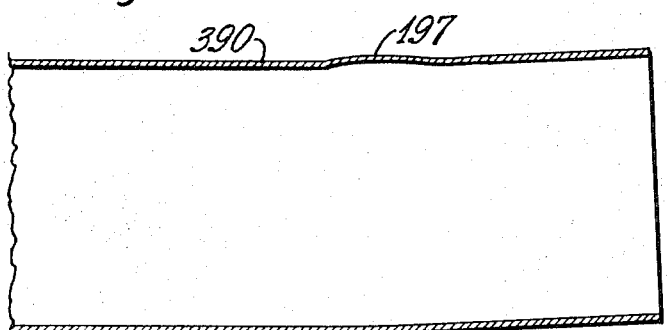
FIG. 27 is a longitudinal sectional view through the tube, the view being taken on the section line 27—27 of FIG. 26.

FIGS. 25 through 30 illustrate actual contours or configurations of a metal tube in initiating and completing a bend in the tube. The portion of the tube 40, shown in FIG. 25 illustrates at 197 the lateral displacement, distortion or cold flow of the metal at a localized region of the tube effected by initial engagement of the bending shoe 168 with the tube which forces the metal, shown at 197 in FIG. 13 into the space 193 shown in FIG. 11. FIGS. 26 and 27 illustrate the cross sectional shape of the tube portion shown in FIG. 22.

Thus, the metal 197 at a localized region of the tubing is caused to move or flow immediately preceding or concomitantly with the start of a bending operation which movement or flow of the metal is continued without interruption by rotation of the bending shoe 168. The rectilinear portion of the tube 40 at the left of the displaced metal 197 is tightly clamped by the clamping dies or jaws 100 and 112.

The force or impact of the bending shoe or wing die 168 engaging the region 397 of the tube diametrically opposite the region of the displaced portion 197 causes a slight upward inclination of the unclamped portion of the pipe or tube 40 at the right of the displaced metal 197 so that flow or movement of the metal at both regions 197 and 397 has begun at the start of bending operation.

The initial movement or cold flowing of the metal at the region of the start of a bend is an important factor in successfully impressing a bend in the pipe or tubing without collapsing of the metal at the bend so that a smooth bending contour is attained.

Figure 28:
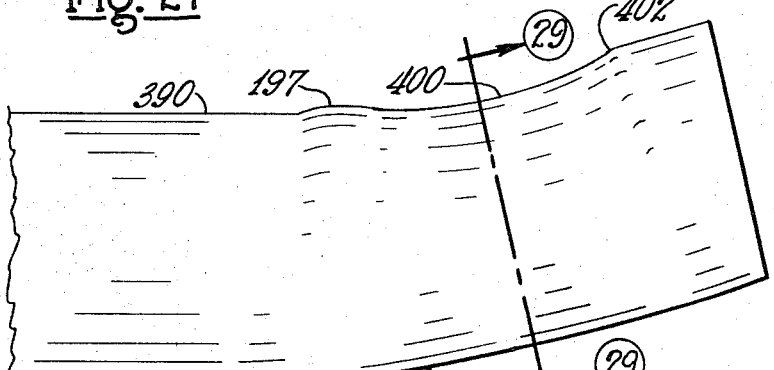
FIG. 28 is an elevational view of a portion of a tube illustrating a completed bend.
Figure 29:
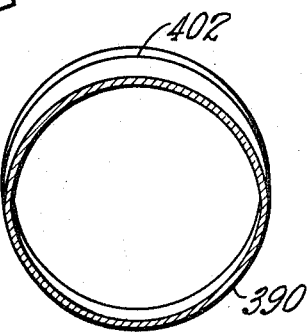
FIG. 29 is a transverse sectional view taken substantially on the line 29—29 of FIG. 28.
Figure 30:
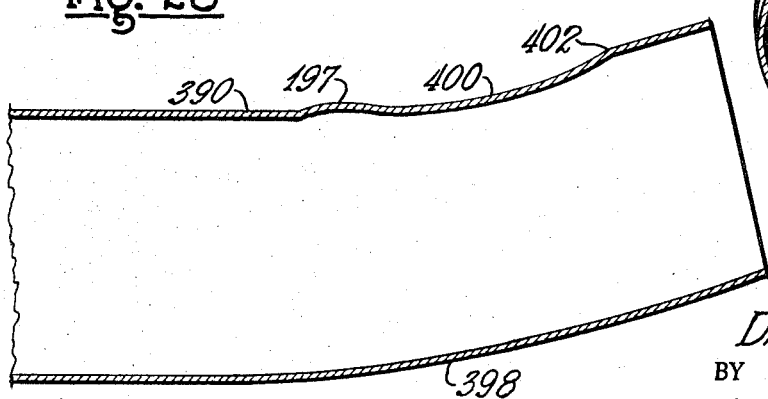
FIG. 30 is a longitudinal sectional view of the bent tube illustrated in FIG. 28.

FIGS. 28 through 30 illustrate the contour of a completed bend in the pipe or tubing 40, the bend being of lesser depth than that shown in FIGS. 14 through 19. During a bending operation the wiper shoe or wing die 168 engages the region 398 of the tube and as the bending shoe rotates, it forces the upper region 400 of the tube into the curvature of the stationary matrix or die 84 to form the bend in the pipe. The completion of the bend is at the region 402 at which zone rotation of the bending shoe 168 has been interrupted.

It should be noted that the diameter of the pipe at the region of the bend 400 is slightly reduced to the stretching of the metal by the action of the bending shoe on the region 398. As the rectilinear portion of the pipe 40 is tightly gripped between the clamping dies or jaws 100 and 112, shown in FIGS. 22 and 23, there is no appreciable stretching of the metal of the tube contained within the clamping dies 100 and 112.

From FIGS. 28 through 30 it will be seen that the bend is of smooth contour without any wrinkles. The bending is accomplished without the use of a mandrel with only a very small reduction in the cross sectional area of the pipe at the bend 400 as compared with the cross sectional area of the rectilinear portion of the pipe 40. Thus a novel configuration of metal tube is produced embodying a circular cylindrical portion and an arcuately-shaped portion with a region of the metal of the tube joining the portions displaced laterally and outwardly of the circular cylindrical portion.

Figure 31:
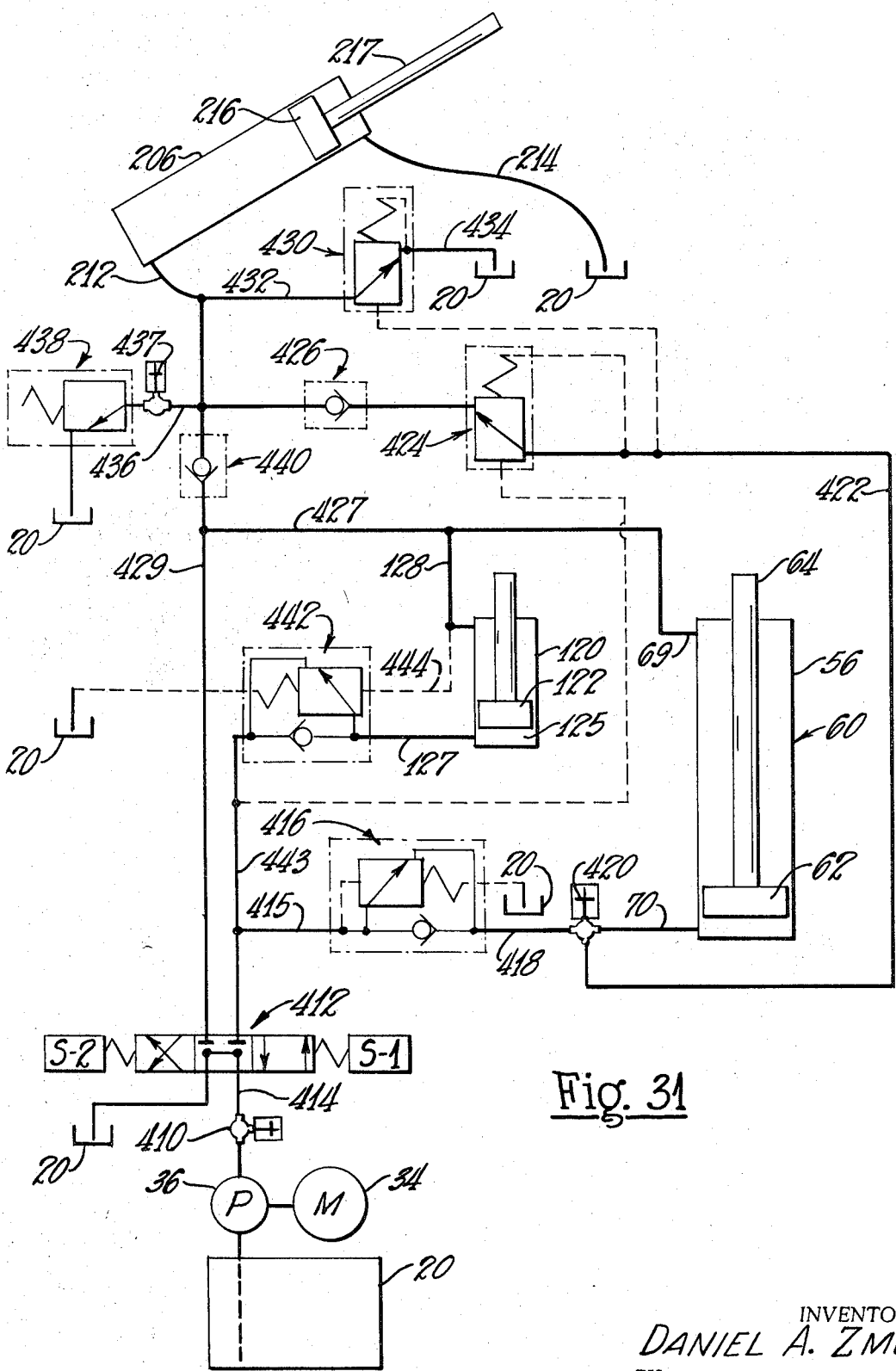
FIG. 31 is a schematic diagram of the hydraulic circuits and actuators for the tube bending apparatus.

FIG. 31 is a schematic diagram of the hydraulic lines, actuators, sequence valves and other operating components of the hydraulic system for effecting tube clamping and tube bending operations. The oil reservoir or oil supply tank 20 is illustrated schematically at several points in FIG. 31 to simplify the diagram. The hydraulic system includes, in addition to the oil supply tank or reservoir 20, a motor 34 driving a hydraulic or oil pump 36 for developing fluid pressure. A pressure gauge 410 may be intercalated with the outlet line of the pump 36.

A conventional Vickers solenoid-operated four-way valve 412 is connected with the metering valve by a fluid line 414. A fluid line 415 is connected with the four-way valve 412 and a first sequence valve 416. A fluid line 418 is connected with the sequence valve 416 and a pressure gauge 420, the latter being connected by a line 70 with the lower end of the cylinder 60 of the actuator 56 which actuates the bending shoes 168 and 172.

The fluid line 418 is connected by a fluid line 422 through a second sequence valve 424 and check valve 426 and fluid line 212 with the lower end of the cushion or reaction cylinder 206, the other end of the cylinder 206 having an outlet or return fluid line 214 to the oil supply 20. A third sequence valve 430 controls hydraulic reaction pressure on the piston 216 which relieves the pressure above a predetermined value whereby the oil flows out of the cylinder 206 to the reservoir 20 through the fluid lines 432 and 434.

The fluid pressure line 436 has a pressure relief valve 438 which is set to normally relieve the pressure when the pressure reaches a predetermined value in the fluid line 436. A pressure gauge 437 is intercalated in the fluid line 436. A check valve 440 is connected in the fluid line 436 as shown. Fluid is supplied to a fourth sequence valve 42 through a fluid line 443 and from the sequence valve 442 to the lower end 125 of the clamping cylinder 120 through a fluid line 127 beneath the piston 122.

The upper end of the cylinder 120 has an outlet line 128 for returning fluid from the upper end of the clamping cylinder to the oil supply 20. The piston in the clamp cylinder 120 is released by flow of oil through line 44 through the sequence valve 442 into the upper end of the cylinder. The operation of the hydraulic actuated mechanisms will be hereinafter explained in describing the operation of clamping a pipe and performing a bend in the pipe.

Figure 32:
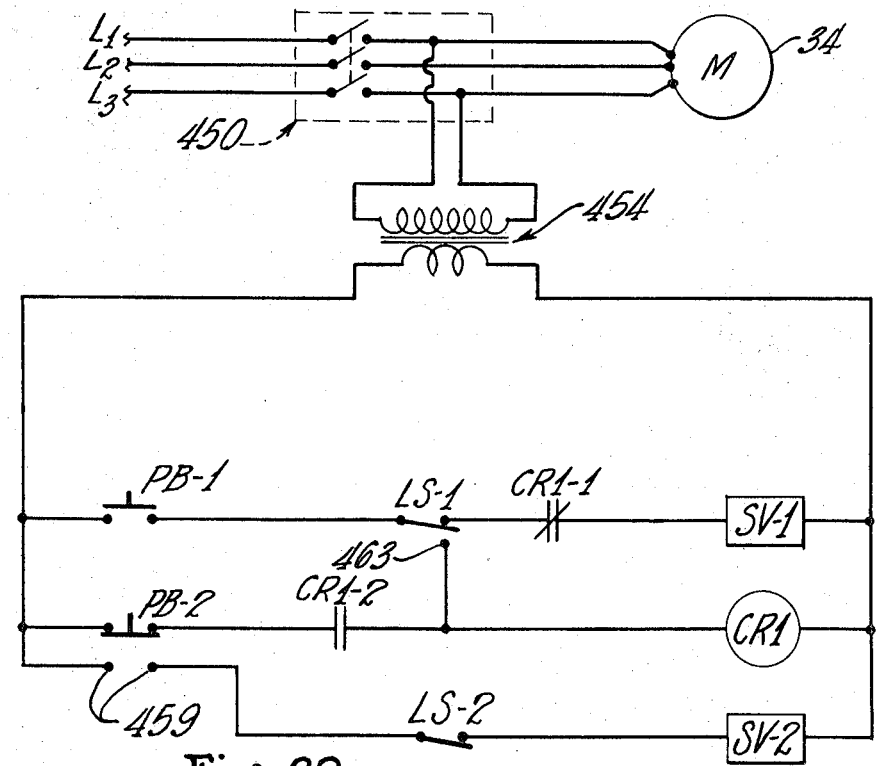
FIG. 32 is a schematic electric circuit diagram of the controls for the hydraulic actuators of the apparatus.

The electrical control circuit is illustrated in FIG. 32. The circuit includes a conventional starter 450 enclosed in a cabinet 461, shown in FIGS. 1 and 3, controlled by "start" and "stop" buttons or plungers 457, the starter being connected with current supply conductors L1, L2 and L3. The oil pump driving motor 34 is connected with and energized by the starter. A transformer 454, contained in a housing 462 shown in FIGS. 1 through 3, is supplied with current through the starter, the transformer reducing the voltage for the components of the control circuit. PB-1 is a push button switch for initiating the operation of a bend. LS-1 is a limit switch 261 which limits the depth of a bend.

SV-1 is a first operative position of the four-way valve 412 when the solenoid S-1 of the valve is energized, and SV-2 is the operative position of the four-way valve 412 when the second solenoid S-2 is energized. PB-2 is a push button switch movable to a position to energize the solenoid S-2 to effect return movement of the bending shoe 168 to its initial position. CR-1 is a control relay enclosed in a cabinet 465, shown in FIGS. 1 and 2, the relay having contacts CR1-1 and CR1-2, the purpose of same being hereinafter explained in connection with the operation of the apparatus. LS-2 indicates a limit switch shown in FIG. 11, which is actuated by the movable clamping die in retracted position to de-energize the solenoid S-2 of the four-way valve 412 to condition the hydraulic system for a succeeding bending operation.

The operation of the apparatus and steps in the method of clamping and forming a bend in a tube or pipe and the steps of advancing and positioning the tube or pipe are as follows: Assuming that the apparatus is in position to receive and accommodate a rectilinear length of tube or tubular stock 40 the operative components of the bending apparatus are in the following positions: The bending shoe or wing die 168 is at its lowermost position shown in FIGS. 1 and 12, that is, its most remote position from the stationary bending die 84, the clamping die 112 is in its lowermost position remote from the stationary clamping die 100, as shown in FIG. 12, and the tube 40 extends through the bushing 314 of the carriage 290 and is in unclamped condition.

A portion of the tube 40 extends beyond the region of the bending die 168, an amount dependent upon the length of unbent tube to be provided in advance of the first bend. With the tube 40 in this position in which to perform a first bend the motor 34 is energized through the starter 450, the motor driving the hydraulic pump 36 to establish hydraulic pressure for operating the hydraulic actuators.

The operator then releases the locking screw 254, shown in FIG. 20, associated with the protractor member 245 and rotates the member 245 relative to the member 230 to bring a particular angle graduation on the protractor scale 247 in registration with the index line 256. The locking screw 254 is then drawn up to securely hold the member 245 to the member 230. Thus if the angle of bend to be formed is twenty-five degrees, the member 247 is adjusted to such position.

The operator then depresses the push button switch PB-1 (see FIGS. 1 and 32) which energizes solenoid S-1 of the four-way valve 412. Oil under pressure from the pump 36 flows through lines 414 and 443, through the sequence valve 42 to the lower end 125 of the clamping cylinder 120, and exerts pressure upwardly against the piston 122 to securely clamp the tube between the clamping dies 100 and 112, the components at this stage being at the positions shown in FIG. 12.

When the movable clamping jaw 112 is in tube-clamping position, the clamping cylinder 120 cannot accommodate more oil and hence the oil pressure rises and sequence valve 16 is piloted at the pressure value for which the sequence valve 416 is set or adjusted. The sequence valve 416 is piloted at the pressure value for oil line 418 through the tube 70 into the bending cylinder 60 beneath the piston 62. At the same time, oil flows through line 422 through the sequence valve 424 past the check valve 426 and through line 212 into the reaction or cushioning cylinder 206.

The piston 62 moves upwardly in the cylinder 60, moving the slide 50 upwardly to engage the movable bending die or shoe 168 with the tube 40. The engagement of the bending die 168 with the tube 40 under fluid pressure on the piston in cylinder 60 effects initial flow, movement or displacement of the metal into the space 193, shown in FIG. 11, the metal being bulged or forced into the space 193 to form the raised region 197, shown in FIGS. 13 and 25 through 30.

The piston 62, under fluid pressure, continues upward movement of the slide 50 causing the rotation or wiping of the bending die or wing die 168 around the stationary die or matrix 84 to effect a bend 199 in the tube or pipe 40, as shown in FIG. 14 the action of wiping the bending die 168 around the stationary die 84 rotating the shaft 152 as it moves upwardly with the slide 50.

During upward movement of the piston 62, the oil above the piston in the cylinder 60 flows through the fluid lines 427 and 429 into the oil supply tank 20. The relative rotation of shaft 152 causes rotation of the arm 218 which produces a mechanical force driving piston 216 in a return or downward direction, as viewed in FIG. 7, in the reaction or cushion cylinder 206, forcing oil at the opposite side of the piston through the line 212 and relief valve 438 to the oil supply. The relief valve 438 may be set to open at a predetermined pressure in the cushion cylinder 206, the relief pressure setting being less than the force acting on the piston 62 in forming a bend in the pipe. As oil is forced from the lower end of cylinder 206, as viewed in FIG. 7, oil is sucked from the oil supply 20 through the fluid line 214 into the upper end head 208 of the cylinder thus avoiding a formation of a vacuum above the piston 216.

The higher force acting on the piston 62 is sufficient to effect a bending of the tube and, as the bending action progresses, the hydraulic pressure acting on the piston progressively increases as the stresses resisting bending increase.

When the increasing pressure approaches the pressure setting of the sequence valve 416, sequence valve 424 is depiloted but oil flow continues. The pressure increase continues until sequence valve 430 is piloted. Pressure on the piston 122 of the clamp cylinder becomes equal to the setting of the sequence valve 416 or the pressure on the piston 62, whichever is the highest.

If the pressure on the piston 62 exceeds the pressure setting of sequence valve 430, this sequence valve permits flow of oil from the cushion or reaction cylinder 206 through the fluid line 434 into the reservoir or oil supply 20 by passing the relief valve 438, and the pressure then existent on opposite sides of the piston 216 of the reaction cylinder is greatly reduced as the bend nears completion.

At the completion of a bend, vis the position of the components shown in FIG. 14, the tube clamp 112 is in tube clamping position and the bending die 168 is in bend-completion position. The operator holds the switch PB–1 in contact-engaging position throughout a tube bending operation. The bend is completed when the abutment screw 258 on the protractor 245 has been moved by rotation of the shaft 152 to engage the plunger of the limit switch LS–1 as in FIG. 14, the limit switch LS–1 being then engaged with a contact 463, shown in the circuit diagram (FIG. 32). Actuation of limit switch LS–1 opens the normally closed contacts of the relay CR1–1 and closes the normally open contacts CR1–2.

This action de-energizes solenoid S–1 of the four-way valve 412 so that the valve is centered, directing oil flow into the supply tank. The operator then manipulates the screw 340 to release the shoe 334 from engagement with the tube 40 and manipulates the screw 366, shown in FIGS. 8 and 9, to release the lever or arm 344 from frictional engagement with the stationary protractor 320 and swings or rotates the arm 344 into registry with the zero line 321 or the 180° line depending upon the direction of angularity of the bend to be formed relative to the angularity of the bend that has just been formed. The sleeve, 326 secured to the arm by member 347, is rotated with the arm. With the arm 344 in a zero degree position or in the 180° position, the operator manipulates the knob 366 to tightly engage the arm 344 to the protractor 320. The operator then manipulates the knob 307 of the locking screw 306 to release the carriage 298 from the track 290. The operator then moves or slides the carriage 298 in a left-hand direction, as viewed in FIG. 15, a distance equal to the distance between the bend 199 which has just been completed and the next succeeding bend to be formed in the tube 40.

The linear distance that the carriage 298 is moved is determined by the graduations on the scale 294, shown in FIG. 10, which is supported in the recess 292 in the carriage supporting track 290. Thus, the carriage is moved until the end face or surface 299 is in registration with the desired graduation of the scale or indexing medium 294. The other end face of the carriage 298 may, if desired, be used as an index in repositioning the carriage.

The carriage 298 and components associated therewith are shown in a readjusted or indexed position in FIG. 15. The knob 340 is then rotated to lock the screw 339 and the semicircular shoe 334 in tight engagement with the tube 40, and the screw 306 drawn up by manipulating the knob 307 to lock the carriage to the track 290.

The operator then actuates the switch PB–2, shown in FIGS. 1, 3 and 32, into engagement with contacts 459, shown in FIG. 32, to complete an energizing circuit through the solenoid S–2 of the four-way valve 412, shown in FIG. 31, this circuit being energized as long as the operator manually holds the switch PB–2 across the contacts 459. Oil under pressure from the pump 36 is now directed through the four-way valve through lines 429, 427 and 69 into the cylinder 60 at the opposite side of the piston 62 to move the piston downwardly in the cylinder 60 which moves the slide 50 downwardly, effecting rotation of the shaft 152 and retracting the bending die 168 to the position shown in FIG. 16.

At the same time oil flows through the line 429 through check valve 440 and tube 212 into the opposite end of the reaction cylinder 206 which moves the piston 216 upwardly as viewed in FIG. 7, which forces the oil in cylinder 206 at the opposite side of the piston through the line 214 into the oil supply or tank 20. FIG. 16 illustrates the bending shoe or die 168 in fully retracted position with the clamping die 112 still in tube clamping position.

As the piston 62 is retracted the oil beneath the piston flows through line 418, sequence valve 416 and fluid line 415, through the four-way valve 412 into the oil supply 20.

When the cylinder 60 is filled with oil under pressure above the piston 62, the piston reaches the bottom of its stroke and pressure builds up in the fluid line 427, piloting the sequence valve 442 whereby oil flows through the line 128 to the upper end of the clamping cylinder 120 exerting downward pressure upon the piston 122 and oil below the piston returned through the sequence valve 442 to the oil supply 20.

Through this action the tube clamp 112 is withdrawn from clamping engagement with the tube 40, as shown in FIG. 17. The clamp 112 is retracted through a distance until the limit switch LS–2, shown in FIG. 11, is engaged by the member 132 attached to the clamping die 112, the limit switch automatically interrupting the circuit through the solenoid S–2, shown in FIG. 31, centering the valve 412 to interrupt oil flow in the event that the operator has not manually released the push button switch PB–2 from engagement with contacts 459, and direct oil through valve 412 to the supply.

While both the bending shoe 168 and the clamping die 112 are disengaged from the tube 40, the tube 40 is locked to the member 326 so that the tube is held against relative movement. With the tube locked to the member 326, the carriage 298 carrying the protractor 320, lever 344 and member 326 is advanced as a unit until the carriage abuts the frame 46, as shown in FIG. 18. This movement advances the tube 40 to the position shown in FIG. 18 but without any relative rotation of the tube having taken place.

With the tube and carriage in the position shown in FIG. 18 and the carriage secured to the track 290 by the clamping knob 307, the operator manipulates the knob 368 to release the arm 344 for movement relative to the protractor 320. The operator then rotates the arm and tube 344, sleeve 326, clamping shoe 334 and tube 40 through an angular distance equal to the angular distance for the next bend to be formed in the tube with respect to the preceding bend. After this action has been completed the arm 344 is locked to the protractor 320 at the desired angle by manipulating the lock screw knob 368.

Through the operations described, the tube is repositioned, as shown in FIG. 19, through a linear distance at which a succeeding bend is to be formed and the tube rotated to provide the desired radial angularity for the bend with respect to the tube axis. The tube 40 is in a position for the operator to close the switch PB–1 to initiate the above described sequence of operations in forming the next succeeding bend. The series of method steps or operations is carried out for each succeeding bend until all of the bends desired in the pipe have been formed.

Thus, an operator, having the specifications of the angularities of the bends, the depth at which each bend is to be formed and the distance between successive bends, is enabled to accurately form a tube to the desired shape or configuration. The configuration of the pipe may be made to accurately conform to the specifications because the tube is always under positive control whenever the tube is advanced or rotated preparatory to a bending operation.

The hydraulic control components are compactly mounted upon a panel 468, shown in FIG. 1, on which is mounted the four-way valve 412, the relief valve 438 and the sequence valves 416, 424, 430 and 442. The check valves and pressure gauges are associated with the components mounted on the panel 468.

The method and arrangement facilitates the formation of a bend in a pipe at substantially lower hydraulic pressures than has heretofore been possible. The following is exemplary of pressures that may be satisfactorily utilized in forming bends. The cross sectional area of the piston 122 in the clamp cylinder 120 may be about five square inches and the sequence valve may be set to release at about 200 pounds pressure per square inch. Thus, the resultant force actuating the movable clamping die 112 is about 1000 pounds.

The area of the piston 62 in the cylinder 60 of the bending shoe actuator 56 may be about 12½ square inches. The sequence valve 416 may be set to release at about 900 pounds pressure per square inch. Thus, the resultant force acting on the piston 62 is about 11,000 pounds. The area of the piston 216 in the reaction or cushioning cylinder 206 may be about 3 square inches and the relief valve 438 may be set to release at a pressure of about 800 pounds per square inch. Thus the reaction force on the piston 216 is about 2,400 pounds.

These exemplary pressures and forces have been found satisfactory in bending tubular stock or tubing for exhaust pipes in the range of 1½ inch diameter to 2½ inches in diameter. It is to be understood that the sequence valves may be set to release at lower or higher pressures and the diameters of the cylinders of the hydraulic actuators may be modified to change the effective forces on the clamping die 112, the bending shoes 168 and 172 and on the piston of the reaction or cushioning cylinder 206.

The bending apparatus is adapted to perform bending operations upon tubes or pipes of different diameters. When it is desired to accommodate the apparatus to a different size of pipe, the components shown in FIG. 11 including the stationary bending die or matrix 84, the clamping shoes 100 and 112, the spacer blocks 160, 161 and the bending die wing die or wiper shoe sections 168 and 172 are replaced with components of dimensions to fit different size tubes or pipes. In addition, the locking shoe 334, shown in FIG. 8, is replaced by a locking shoe of a different size to accommodate the pipe.

The auxiliary or supplemental bending die or wiper shoe section 172 is normally utilized in association with the bending die or wiper shoe section 168 in order to provide additional surface area for engagement with the tube or pipe during a bending operation. In instances where the distance between successive bends is short, the auxiliary or supplemental bending shoe section 172 may be readily removed to facilitate forming a succeeding bend.

Where different sizes of tube or pipe are to be bent, an auxiliary or supplemental bending shoe section 172 is provided of the same cross sectional shape as the bending shoe section 168. The spacer blocks 160, 161 and the die 112 for different sizes of tube are of different thicknesses to accommodate the different sizes of tube.

FIGS. 1, 2 and 3 illustrate the bending apparatus wherein the apparatus is arranged at two different angles in different planes. In FIG. 1 it will be noted that the rectilinear axis of the tube 40 is at an angle of about fifteen degrees with respect to the floor surface F and the axis of the bending apparatus is therefore at about fifteen degrees with respect to a vertical axis. Exhaust pipes for vehicle installation are usually several feet in length being upwards of twelve feet or more in length for some vehicles.

A substantial number of bends is required in most exhaust pipe constructions in order to avoid interference with structural components or frame members of a vehicle, and such bends are at varying angles and of varying depths. By inclining the axis of the tube 40, as shown in FIG. 1, the various successive bends may be impressed in the tube or pipe without the right-hand end of the tube impinging or engaging the floor. Through this angular arrangement of the bending apparatus, it is unnecessary to provide a pit or excavation to accommodate the bent pipe.

As shown in FIGS. 2 and 3, the bending module or unit is arranged in an angular position, being inclined forwardly at about forty-five degrees with respect to the floor F. This facilitates the use of the machine by the operator and provides for easy access to the controls. While the angularities for the bending apparatus above described have been found preferable, it is to be understood that these angularities may be varied depending upon the place of use of the apparatus.

It should be further noted that the components of the bending apparatus are mounted on a single frame component 46 so that the module provided by the assembly on the frame component 46 may be mounted in other positions or may be mounted in a suspended position if desired. This versatility of position is possible as the hydraulic connections between the oil pump and the components of the module may be flexible whereby the reservoir or tank 20, motor 34 and the oil pump 36 may be in positions other than those illustrated herein.

In the event that the pipe tends to stick or adhere to the knurled surface of one or the other of the clamping dies 100 and 112 upon release of the clamping die 112, it may be necessary to effect complete disengagement of the pipe by striking the pipe with an instrument, such as a hammer. By supporting the member 312 and sleeve 326 and associated components upon the trunnion 315, the slight tilting of the pipe in loosening the same will not damage the sleeve 326 and will not effect release of the tube locking screw 339. This slight tilting of the tube in loosening the same is illustrated in FIG. 17.

It will be apparent that applicant's method of bending metal tubing is inclusive of the steps of restraining the tubing against longitudinal movement preparatory to forming a bend in the tubing and exerting a force laterally against the tubing at a localized region adjacent the tube restraining means to effect initial cold flow or displacement of the metal at the localized region. Bending of the pipe is performed by continuing the application of lateral force against the tubing at a zone adjacent the displaced metal, the bending shoe wiping the tubing about the stationary matrix 84 in an arcuate configuration to form a bend. The stretching of the metal of the clamped portion of the tube during bending is inappreciable, and stretching of the metal is further restrained by the displaced metal anchored in the pocket or zone 193. It is to be understood that the configuration of the pocket or space 193 may be modified in lieu of the curved portion of the matrix at the left side of the plane A—A, shown in FIG. 11. For example, the matrix 84 at the left-hand side of the plane A—A, as viewed in FIG. 11, may be formed with a notch providing a rectangular space into which the metal may be displaced to form the configuration 197 in FIG. 13.

It is to be understood that while the embodiment of the apparatus illustrated is particularly adapted for forming successive bends in tubular stock, tubing or pipe utilized with internal combustion exhaust systems of automotive vehicles, the bending apparatus is adaptable for bending tubing or tubular stock for other uses.

It is apparent that, within the scope of the invention, modifications and different arrangements may be made other than as herein disclosed, and the present disclosure is illustrative merely, the invention comprehending all variations thereof.

I claim:

1. Apparatus for bending tubing including, in combination, support means, a member reciprocably mounted by the support means, a relatively stationary bending die mounted by the support means, a wiper die, means mounting the wiper die for movement with said member and for rotative movement relative to the member, means for clamping the tubing adjacent the stationary bending die, and means for effecting movement of said member to engage the wiper die with the clamped tubing to effect lateral displacement of a region of the wall of the tubing adjacent the bending die and to effect relative rotative movement of the wiper die to form a bend in the tubing without effecting movement of the clamped region of the tubing.

2. Apparatus for bending tubing including, in combination, support means, a member slidably mounted by the support means, a relatively stationary bending die mounted by the support means, a wiper die, means mounting the wiper die for longitudinal movement with the slidable member and for rotative movement relative to the slidable member, means for clamping the tubing adjacent the bending die, means for effecting slidable movement of the member to engage the wiper die with the clamped tubing to effect lateral displacement of a region of the wall of the tubing adjacent the bending die and to effect relative rotative movement of the wiper die about the stationary die to form a bend in the tubing.

3. Apparatus for bending metal tubing including, in combination, support means, a relatively stationary bending die, relatively movable tube bending means, tube clamping means, an actuator for effecting relative movement of said tube clamping means to engage the tubing, an actuator for effecting relative movement of said tube bending means to engage the tubing, said means being operative in engagement with the tubing to clamp the tubing and displace metal of the tubing laterally and to bend the tubing adjacent the displaced metal about a region of the stationary die.

4. Apparatus for bending metal tubing including, in combination, frame means, a slide member mounted for reciprocation relative to the frame means, a stationary die, a bending die mounted by the slide member for movement relative thereto, tubing clamp means disposed adjacent the stationary die, actuating means for reciprocating the slide member, means for actuating the clamp means to clamping and release positions, means associated with said bending die for limiting the depth of a bend in the tubing, and a surface defining a space adjacent the clamp means to accommodate lateral movement of the metal of the tube by actuation of the bending die at the start of a bending operation.

5. The combination according to claim 4 including track means, a carriage reciprocable lengthwise of the track means, and means mounted by the carriage for engagement with the tubing for controlling the relative position of the tubing when said clamp means is disengaged from the tubing.

6. The combination according to claim 4 including means associated with the carriage for indicating the position of the carriage relative to the clamp means.

7. Apparatus for bending rectilinear metal tubing including, in combination, frame means, a slide member reciprocably mounted by the frame means, a stationary die supported by the frame means, a relatively movable bending die mounted by the slide member, clamping means for holding the tubing in fixed relation to said stationary die, means for reciprocating said slide member to actuate the bending die to engage the bending die with the clamped tubing to effect lateral displacement of a region of the wall of the tubing adjacent the bending die and to effect rotative movement of the bending die to form a bend in the tubing, and means for actuating said tubing clamping means to tube holding and tube release positions, said clamping means being positioned whereby to secure an unbent rectilinear region of the tubing in an angular position with respect to a horizontal plane.

8. The combination according to claim 7 wherein the slide member is reciprocable in a plane normal to the longitudinal axis of the clamping means for the tubing.

9. The combination according to claim 7 wherein the rectilinear direction of reciprocation of the slide member is inclined forwardly relative to a vertical axis.

10. Apparatus for bending metal tubing including, in combination, frame means, a slide member mounted for reciprocation relative to the frame means, a stationary die mounted by the frame means, a bending die, shaft means journally mounted on the slide member supporting the bending die, relatively movable clamping means for holding the metal tubing adjacent said stationary die, a first hydraulic actuator for actuating said clamping means, a second hydraulic actuator for reciprocating said slide member, means responsive to rotational movement of the bending die arranged to control said second hydraulic actuator for limiting the depth of bend in the tubing, a surface adjacent the stationary clamp means defining a space into which metal of the tubing is displaced concomitantly with the start of a bending operation, and reaction means responsive to rotational movement of the bending die in forming a bend for resisting rotational movement of the bending die.

11. The combination according to claim 10 wherein the reaction means is a hydraulic actuator operatively connected with the shaft means.

12. Apparatus for bending metal tubing including, in combination, frame means, a slide member mounted for reciprocation relative to the frame means, a stationary die mounted by the frame means, a bending die, shaft means journally mounted on the slide member carrying said bending die for rotative movement of the bending die relative to the stationary die, clamp means for holding the metal tubing adjacent said dies, actuating means for reciprocating said slide member to engage the bending die with the clamped tubing to effect lateral displacement of a region of the wall of the tubing adjacent the bending die and to effect relative rotative movement of the bending die to form a bend in the tubing, means for actuating the clamp means to clamping and release positions, a movable element actuated by relative movement of said bending die, means associated with said element for indicating the extent of relative movement of the bending die, and means actuated by said relatively movable element for interrupting the relative movement of said bending die for determining the depth of a bend.

13. The combination according to claim 12 including relatively stationary track means, carriage means movable lengthwise of the track means, a member mounted by said carriage means adapted for engagement with the tubing, means mounted by said member for locking the tubing to said member, said member being rotatable relative to the carriage means for rotating the tubing, means mounted by the carriage means for indicating the extent of rotation of said tubing, said carriage being movable to a position advancing the tubing relative to the bending die, and means associated with said track means for indicating the extent of advancing movement of said carriage means.

14. The combination according to claim 13 including releasable means for locking said carriage means to the track means.

15. The combination according to claim 13 including a support member mounted by said frame means, and means secured to said track means and adjustable relative to the support member for adjusting the relative position of said track means.

16. Apparatus for bending metal tubing including, in combination, frame means, a slide member mounted for reciprocation relative to the frame means, a stationary are mounted by the frame means, a shaft journally mounted on the slide member, means providing a platform rotatable with said shaft, tube bending means including main and supplemental bending dies, means for securing the bending dies to said platform, a relatively stationary clamp member mounted adjacent said stationary die, a relatively moveable clamp member for cooperation with said stationary clamp member for holding the metal tubing adjacent said dies, said stationary die having a surface adjacent the stationary clamp means defining a space accommodating laterally displaced metal of the tubing, hydraulic actuating means for actuating the relatively movable clamp member, hydraulic actuating means for actuating said relatively movable bending die, and control means for said hydraulic actuating means for actuating the movable clamp member to engage the tubing in advance of engagement of the movable bending die with the tubing.

17. Apparatus for bending metal tubing including, in combination, frame means, a slide member mounted for reciprocation relative to the frame means, a stationary bending die mounted by the frame means, a movable bending die, means journally mounted on the slide member supporting the bending die for rotational movement relative to the stationary die, relatively moveable clamp means for holding the metal tubing adjacent said stationary die, a first hydraulic actuator for actuating the clamp means, a second hydraulic actuator for reciprocating said slide member, adjustable means responsive to rotational movement of the bending die arranged to control said second hydraulic actuator for limiting the depth of bend in the tubing, a surface adjacent the stationary die defining a space accommodating displaced metal of the tubing at the start of a bending operation, fluid reaction means for resisting rotational movement of the movable die during a bending operation, multiway solenoid-operated valve means for selectively directing fluid into and out of the actuators, an energizing circuit for said solenoid-operated valve means, said circuit including switch means for moving said valve means to direct liquid into said hydraulic actuators to clamp the tubing and actuate the slide member whereby the movable bending die forms a bend in the tubing, a limit switch in said circuit cooperating with said adjustable means for influencing the valve means to determine the depth of the bend in the tubing, and switch means in said circuit controlling said multiway valve means to direct fluid through the hydraulic actuators in a direction to retract the bending die from engagement with the tubing and to disengage the movable clamp means from the metal tubing.

18. Apparatus for bending metal pipe including, in combination, frame means, a slide member mounted for reciprocation relative to the frame means, a stationary matrix mounted by the frame means, a shaft journally mounted on the slide member and having a ledge portion offset from the axis of the shaft, a pipe-bending body removably supported upon said ledge and arranged for cooperation with the stationary matrix for impressing a bend in a pipe, a relatively stationary clamp means disposed adjacent the matrix, a movable clamp means for cooperation with the stationary clamp means for restraining longitudinal movement of the pipe, a first hydraulic actuator for actuating the movable clamp means, a second hydraulic actuator for reciprocating said slide member, adjustable means associated with the pipe bending body arranged to control said second hydraulic actuator for limiting the depth of bend in the pipe, said matrix having a surface adjacent the stationary clamp means defining a chamber into which metal of the pipe is displaced concomitantly with the start of a bending operation, a hydraulic reaction means resisting rotational movement of the pipe bending body during the forming of a bend in the pipe, track means mounted by the frame means, a carriage movable lengthwise of the track means, pipe engaging means supported on the carriage for rotation relative thereto, locking means on the pipe engaging means for securing the pipe to the pipe engaging means, an arm secured to the pipe engaging means, a protractor member associated with said carriage, means for removably locking the arm to said protractor member, an electrically actuated valve means for controlling flow of liquid into and away from said hydraulic actuators for actuating and retracting the clamp means and for actuating the bending body to form a bend in the pipe and retracting the bending shoe from engagement with the pipe upon completion of a bend.

References Cited
UNITED STATES PATENTS

| | | | |
|---|---|---|---|
| 2,430,217 | 11/1947 | Eastes | 72—166 |
| 3,339,385 | 4/1966 | Lance | 72—22 |
| 3,299,681 | 1/1967 | Hautau | 72—7 |
| 2,535,949 | 12/1950 | Offutt | 72—97 |

JOHN F. CAMPBELL, Primary Examiner

M. J. KEENAN, Assistant Examiner

U.S. Cl. X.R.

72—23, 32, 298